US007525955B2

(12) United States Patent
Velez-Rivera et al.

(10) Patent No.: US 7,525,955 B2
(45) Date of Patent: Apr. 28, 2009

(54) INTERNET PROTOCOL (IP) PHONE WITH SEARCH AND ADVERTISING CAPABILITY

(75) Inventors: Carlos J. Velez-Rivera, Mayaguez, PR (US); Inaki Olivares-Arocho, Mayaguez, PR (US); Jose L. Cruz-Rivera, Rincon, PR (US)

(73) Assignee: Commuca, Inc., Erie, CO (US)

( * ) Notice: Subject to any disclaimer, the term of this patent is extended or adjusted under 35 U.S.C. 154(b) by 511 days.

(21) Appl. No.: 11/082,361

(22) Filed: Mar. 17, 2005

(65) Prior Publication Data

US 2005/0207432 A1    Sep. 22, 2005

Related U.S. Application Data

(60) Provisional application No. 60/554,548, filed on Mar. 19, 2004, provisional application No. 60/554,544, filed on Mar. 19, 2004.

(51) Int. Cl.
*H04L 12/66*    (2006.01)

(52) U.S. Cl. .................. 370/352; 709/219; 379/114.13
(58) Field of Classification Search ................. 370/352; 709/219; 379/114.13
See application file for complete search history.

(56) References Cited

U.S. PATENT DOCUMENTS

| 2002/0133396 | A1 | 9/2002 | Barnhart |
| 2003/0004937 | A1 | 1/2003 | Salmenkaita |
| 2003/0136835 | A1 | 7/2003 | Chung et al. |

*Primary Examiner*—Quynh H Nguyen
(74) *Attorney, Agent, or Firm*—Ruben C. DeLeon

(57) ABSTRACT

A software platform in an Internet Protocol (IP) phone having the ability to be used with different communication infrastructures such as broadband, wireless communication and Plain Old Telephone System (POTS) service. Further, the software platform in the IP phone has the ability to be used with different applications operating on the IP phone. Further, the IP phone has the ability to perform additional functionality than traditional Public Switched Telephone Network (PSTN) phones, such as searches and advertising, given its ability to converge voice and data within a single terminal.

24 Claims, 27 Drawing Sheets

INTERNET PROTOCOL (IP) PHONE WITH SEARCH AND ADVERTISING CAPABILITY

PRIORITY BENEFIT AND CROSS REFERENCE TO RELATED APPLICATIONS

This application is related to the following commonly owned copending U.S. Patent Applications:

Provisional Application Ser. No. 60/554,548, "Method For Rapid Development Of Differentiated Converged Communications Terminals Based On A Flexible Software Platform", filed Mar. 19, 2004, and claims the benefit of its earlier filing date under 35 U.S.C. 119(e).

Provisional Application Ser. No. 60/554,544, "Flexible Software Platform For Differentiated Converged Communications Terminals", filed Mar. 19, 2004, and claims the benefit of its earlier filing date under 35 U.S.C. 119(e).

TECHNICAL FIELD

The present invention relates to the field of an internet phone system, and more particularly to an Internet Protocol ("IP") phone with search and advertising capability that includes a platform adaptable to be used with different applications running on the IP phone as well as adaptable to be used with different communication infrastructures.

BACKGROUND INFORMATION

Recently, multimedia communication in which voice, video and data information are transmitted and received using the Internet Protocol (IP) is carried over an IP network. A phone, referred to herein as an "IP phone" or more generally as a "converged communications terminal" may be connected directly to the IP network over which a multimedia phone exchange system can be constructed. An IP phone is a telephone which can operate and execute voice communication in the same way as conventional telephones either via a Plain Old Telephone System (POTS) or an IP network. Further, the IP phone can use the IP network for data applications. For example, IP phones may be connected to an IP network, such as a local area network, in an office environment thereby using the network as a private telephone network circuit and as a data exchange network. In another example, IP phones may use a wide area network, e.g., Internet, to communicate with other properly configured IP phones for data-voice exchanges. In another example, IP phones may use a data network for transactional data applications and the POTS network for voice.

IP phones currently have features similar to those found in traditional public switched telephone network (PSTN) phones such as call forwarding, call waiting, conference calls and so forth. Enhancements to these feature sets have been slow in coming, as market leaders in the "Voice over IP" (VoIP) telephony field have pursued an incremental approach to their product offerings, particularly because of the lack of computing power available in VoIP platforms. Currently, VoIP platforms may have to be specifically designed for a target market area and software application operating on the IP phone. For example, a unique VoIP platform may have to be developed to operate a software application used to allow the user of the IP phone to vote on an election. A separate unique VoIP platform may have to be developed to operate a hospitality application used for saving voice messages, issuing wake-up calls, scheduling room service, tracking complaints, etc. By having to design and implement separate VoIP platforms for each application operating on the IP phone, the cost in operating different applications on an IP phone may be prohibitive.

Furthermore, current IP phones are not adaptable to be used with different communication infrastructures, such as broadband, wireless communication and POTS service. For example, current IP phones may not be able to connect to a broadband modem to access a software application while also being connected to a POTS line to access voice. By not being able to access multiple different communication infrastructures concurrently, the user of an IP phone is limited on the uses of the IP phone.

Further, current users of an IP phone do not have the ability to perform searches such as in a contextual advertisement space on the IP phone. 27% of all on-line searches are aimed at finding local services or businesses, while 2 out of 3 small and medium size businesses still rely heavily on the phone for sales leads. There appears to be a strong demand for allowing the user of an IP phone to locate a business with ease such as in a contextual advertisement space while at the same time allowing the businesses to target advertisements to consumers with broadband connections to the home for data and either VoIP or POTS service for voice.

Therefore, there is a need in the art for an IP phone configured with a VoIP platform that can support different applications operating on the IP phone. Further, there is a need in the art for an IP phone that is adaptable to be used concurrently with various communication infrastructures. Further, there is a need in the art for an IP phone with the capability of implementing features beyond those found in traditional PSTN phones, such as the ability to perform searches and advertising.

SUMMARY

The problems outlined above may at least in part be solved in some embodiments by a software platform in an IP phone having the ability to be used with different communication infrastructures such as broadband, wireless communication, POTS service. Further, the software platform in the IP phone has the ability to be used with different applications operating on the IP phone. Further, the IP phone has the ability to perform additional functionality than traditional PSTN phones, such as searches and advertising, given its ability to converge voice and data within a single terminal as described herein.

In one embodiment of the present invention, a system comprises an Internet Protocol (IP) phone coupled to a server where the IP phone is configured to receive contextual information from the server. The IP phone may comprise a memory unit operable for storing a computer program for performing contextual searches. The IP phone may further comprise a processor coupled to the memory unit where the processor, responsive to the computer program, comprises circuitry for receiving a command to perform a contextual search. The processor may further comprise circuitry for receiving search criteria. The processor may further comprise circuitry for submitting the search criteria to the server. The processor may further comprise circuitry for receiving from the server a list of merchants matching the search criteria and information regarding each of the merchants in the list.

In another embodiment of the present invention, a system comprises an Internet Protocol (IP) phone coupled to a server where the IP phone is configured to receive a ballot from the server. The IP phone comprises a memory unit operable for storing a computer program for performing a vote on the ballot. The IP phone may further comprise a processor coupled to the memory unit where the processor, responsive to the computer program, comprises circuitry for receiving the ballot from the server. The processor may further comprise circuitry for selecting either yes, no or abstain for each issue on the ballot. The processor may further comprise circuitry for submitting the selections for each issue on the ballot to the server.

In another embodiment of the present invention, a system comprises an Internet Protocol (IP) phone comprising a software platform where the software platform comprises a first layer controlling a hardware configuration of the IP phone. The software platform may further comprise a second layer interacting with the first layer. The second layer may provide an execution environment. The software platform may further comprise a third layer interacting with the second layer. The third layer may interface with multiple communication infrastructures. The software platform may further comprise a fourth layer interfacing with the third layer. The fourth layer may provide communication services and data services required by applications. The software platform may further comprise a fifth layer interfacing with the fourth layer. The fifth layer may implement logic used to run applications operating on the IP phone.

In another embodiment of the present invention, a method for developing domain-specific applications for Internet Protocol (IP) phone may comprise the step of defining a requirement specification for an application. The method may further comprise identifying features of a first software layer in a software platform of an IP phone to be incorporated into the application. The first software layer may be configured to provide communication services and data services required by the application. The method may further comprise enabling the identified features in the first layer in the software platform of the IP phone. The method may further comprise building a client interface to allow features required for the application to be implemented but are not covered by the first layer to collaborate with the first layer in the software platform of the IP phone. The method may further comprise implementing the features not covered by the first layer but are required for the application to be implemented.

In another embodiment of the present invention, a system comprises a server where the server comprises a front-end console configured to present a selective view of all data accessible. The server may further comprise a transaction engine coupled to the front-end console where the transaction engine is configured to handle transactions from an Internet Protocol (IP) phone coupled to the server. The server may further comprise a plurality of databases coupled to the transaction engine where the plurality of databases is configured to store sales information, records of transactions, vendor information, consumer information and scheduling information as to when transaction applications are distributed. The server may further comprise a settlement manager coupled to the front-end console and the transaction engine. The settlement manager may be configured to maintain a log of actions performed by a user of the IP phone during a communication session with the server.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Although the present invention is described with reference to an Internet Protocol (IP) phone it is noted that the principles of the present invention may be applied to any Internet connected device, such as an Internet appliance. It is further noted that embodiments applying the principles of the present invention to such Internet connected devices would fall within the scope of the present invention.

In the following description, numerous specific details are set forth to provide a thorough understanding of the present invention. However, it will be apparent to those skilled in the art that the present invention may be practiced without such specific details. In other instances, well-known circuits and software modules have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
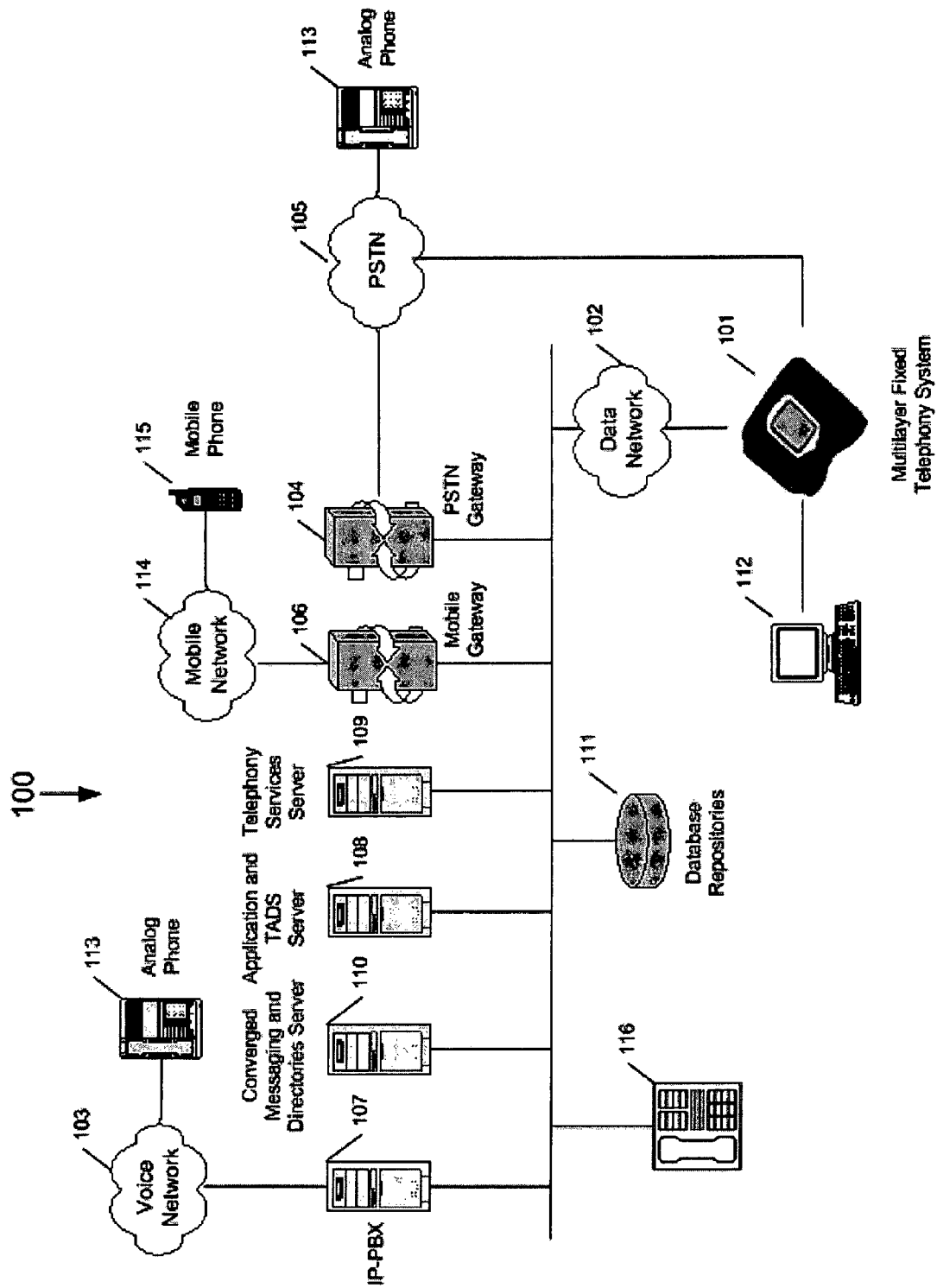
FIG. 1 illustrates an embodiment of the present invention of a system implementing a multi-layer fixed telephone system interacting with different communication infrastructures.

FIG. 1 illustrates a high level diagram of an embodiment of the present invention of a system 100 implementing a multi-layer fixed telephone system 101 interacting with different communication infrastructures. Referring to FIG. 1, system 100 allows multi-layer fixed telephone system 101 (referred to herein as an "IP phone") to interact with other entities over different communication infrastructures, such as data, voice, mobile and Public Switched Telephone Networks (PSTN) 102, 103, 114, 105, respectively, to provide telephony functions and run applications. A more detailed description of the external configuration of IP phone 101 is described below in association with FIG. 2. Further, a more detailed description of the hardware configuration of IP phone 101 is described further below in association with FIG. 27. In one embodiment, IP phone 101 may be coupled to a computer system 112, data network 102 and a Public Switched Telephone Network (PSTN) 105. IP phone 101 may communicate with third-party voice over IP (VoIP) terminals 116 via data network 102. IP phone 101 may further communicate with an analog phone 113 over PSTN 105. IP phone 101 may further communicate with analog phone 113 over voice network 103 via data network 102. Further, IP phone 101 may communicate with a mobile phone 115 over mobile network 114 via data network 102.

System 100 may further include a Public Switched Telephone Network (PSTN) Gateway 104 coupled to data network 102. PSTN gateway 104 may be configured to translate signaling and media between data network 102 coupled to IP phone 101 and PSTN 105. PSTN 105 may be coupled to conventional telephone 113. PSTN gateway 104 may allow IP phone 101 to communicate with standard analog telephones 113 in PSTN 105.

System 100 may further include a mobile gateway 106 coupled between data network 102 and mobile network 114. Mobile gateway 106 may be configured to translate signaling and media between data network 102 and mobile network 114. Mobile network 114 may be coupled to mobile telephone 115. Mobile gateway 106 may allow IP phone 101 to communicate with mobile phones 115 in mobile network 114. IP phone 101 may signal mobile gateway 106 in order to enable calls destined to mobile telephone 115 to be terminated on IP phone 101.

System 100 may further include an Internet Protocol-Private Branch exchange (IP-PBX) 107 coupled to data network 102, voice network 103 and analog phones 113 or VoIP network 116. IP-PBX 107 may be configured to interconnect voice and data networks 103, 102, respectively, in an enterprise environment and provide centralized call control functionality.

System 100 may further include an application server 108 coupled to data network 102. Application server 108 may be configured to contain the server side components (discussed further below) of client/server applications accessed through IP phone 101, such as the components of the Transactional Application Delivery System (TADS) (discussed further below).

System 100 may further include a telephony services server 109 coupled to data network 102. Telephony services server 109 may be configured to provide services that allow IP phone 101 to communicate with other analog and VoIP terminals and extend its range of available telephony features.

System 100 may further include a converged messaging and directory server 110 coupled to data network 102. Converged messaging and directory server 110 may be configured to contain all the components necessary to provide the user with a unified converged platform to send and receive electronic and voice mail messages. In addition, server 110 may provide IP phone 101 with access to personal and public contact directories.

System 100 may further include a database repository 111 coupled to data network 102. Database repository 111 may be configured to manage and provide IP phone 101 and servers 107, 108, 109 and 110 with data needed to perform their tasks.

It is noted that FIG. 1 is illustrative and that not all of the components of system 100 were depicted for the sake of brevity (e.g., provisioning and configuration servers). It is further noted that system 100 is not to be limited in scope to the system disclosed.

Figure 2:
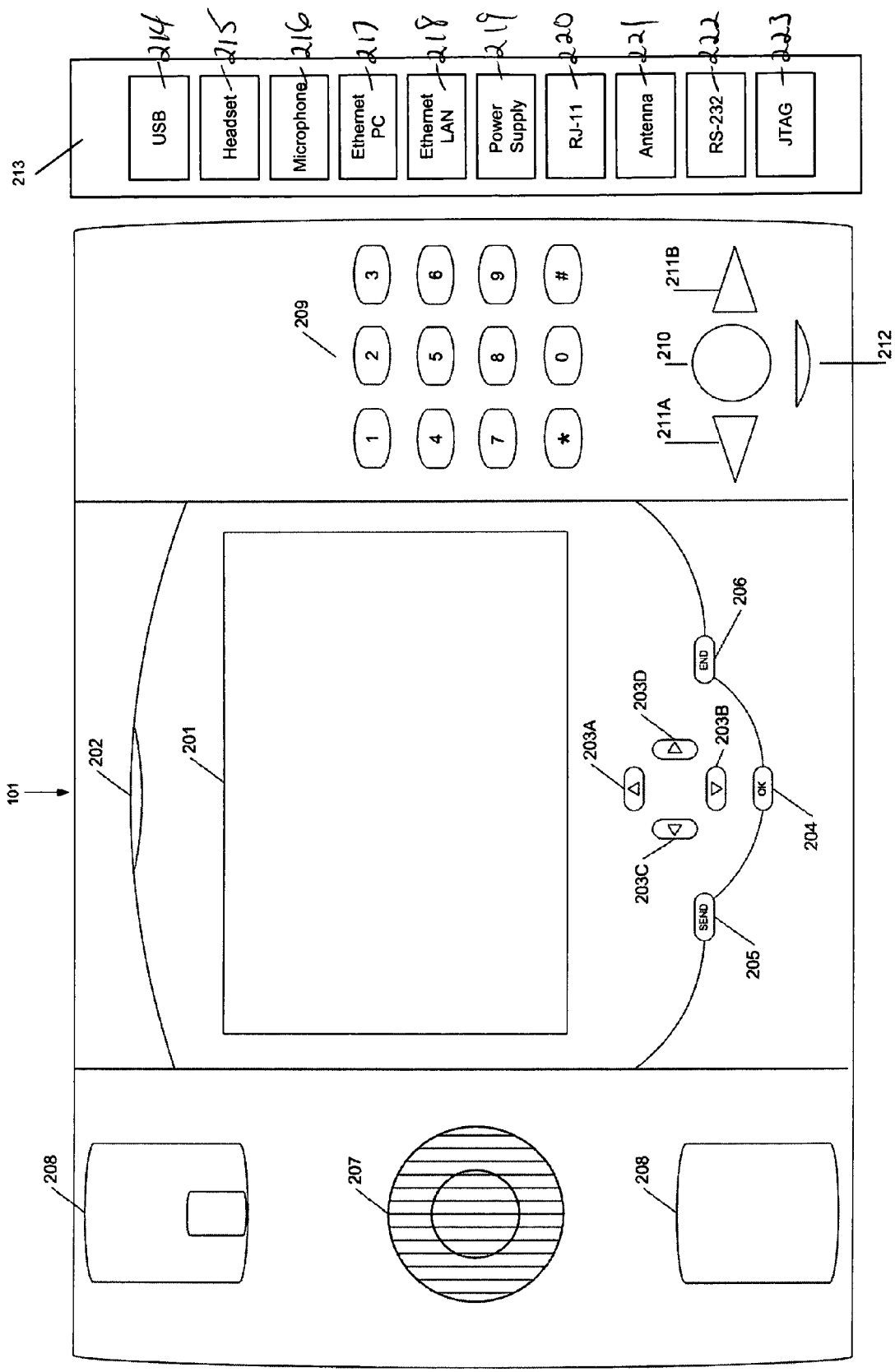
FIG. 2 illustrates an embodiment of the present invention of an external configuration of an IP phone.

FIG. 2 illustrates an embodiment of the present invention of an external configuration of IP phone 101. Referring to FIG. 2, IP phone 101 includes a touch screen display 201 with the capability of displaying graphical images and collecting input from the user by pressing certain areas in the screen with a finger or an instrument designed for such purposes such as a stylus. IP phone 101 may further include a message waiting indicator 202 to alert the user that a new message has arrived to the user's inbox. Below touch screen display 201, IP phone 101 includes four directional keys 203A-D (203A configured to move an image displayed on screen 201 up; 203B configured to move an image displayed on screen 201 down; 203C configured to move an image displayed on screen 201 to the left; and 203D configured to move an image displayed on screen 201 to the right); and an OK button 204 to navigate the user interface screens 201 and select items in focus, as an alternative to using the touch screen. To each side of directional keys 203A-D, IP phone 101 includes SEND and END keys 205, 206, respectively. Keys 205, 206 may be used as an alternative to the touch screen to exercise telephony features in graphical user interface screen 201 such as initiating and finishing a call. In addition, keys 205, 206 can be used to help the user navigate the user interface; for example, using END button 206 to go directly to the home screen or cancel some operation. IP Phone 101 also includes the following connectors distributed along side 213 for external devices: Universal Serial Bus (USB) 214, headset 215, microphone, 216, Ethernet switched port for Personal Computer (PC) and Local Area Network (LAN), 217 and 218, respectively, power supply 219, RJ-11 (POTS) connector 220, antenna 221 for support of wireless protocols such as, but not limited to, wireless fidelity (WI-FI) and Zigbee, RS-232 serial port 222, and JTAG connector 223.

IP phone 101 may further include an opening 207 for a phone speaker and a handset cradle 208 for corded or cordless handsets. IP phone 101 may further include a standard telephony keypad array 209 consisting of digits 0 to 9, the star and pound keys. Below keypad 209, IP phone 101 may include a circular key 210 used to activate and deactivate speakerphone 207. At each side of speakerphone key 210, two triangular keys 211A-B may be used to increase (211B) and decrease (211A) the volume of the active audio output: handset, headset, speaker or ringer. Below speakerphone and volume keys 210, 211A-B, respectively, IP phone 101 includes an indicator 212 that turns on when speakerphone 207 is active and turns off when speakerphone 207 is inactive.

An embodiment of the hardware configuration of IP phone 101 is provided below in association with FIG. 27. Referring to FIG. 27, IP phone 101 may include a processor 2701 coupled to various other components by system bus 2713. An operating system 2710 may run on processor 2701 and provide control and coordinate the functions of the various components of FIG. 27. An application 2711 in accordance with the principles of the present invention may run in conjunction with operating system 2710 and provide algorithms, domain-specific knowledge and calls to operating system 2710 where the algorithms, domain-specific knowledge and calls implement the various functions or services to be performed by application 2711. Application 2711 may include, for example, an application configured to perform a contextual search as discussed further below in association with FIG. 21. Application 2711 may further include an application configured to perform a local caching of contextual search results as discussed further below in association with FIG. 22. Application 2711 may further include an application configured to perform a one-touch call as discussed further below in association with FIG. 23. Application 2711 may further include an application configured to order from a merchant using the no contact call service feature as discussed further below in association with FIG. 25. Application 2711 may further include an application configured to vote on one or more issues on a ballot as discussed further below in association with FIG. 26. Application 2711 may further include an application configured to host other domain-specific applications as discussed further below in association with FIG. 7. Application 2711 may further include an application configured for a specific IP phone that can be retargeted to a new hardware platform and/or operating system as discussed further below in association with FIG. 8. Application 2711 may further include an application configured for a specific IP phone that can be retargeted to a new communications infrastructure as discussed further below in association with FIG. 9

Read only memory (ROM) 2702 may be coupled to system bus 2713 and could include a basic input/output system ("BIOS") that controls certain basic functions of IP phone 101. Persistent memory ("FLASH") 2712 may be coupled to system bus 2713 and include the operating system 2710, configuration data and user data. It is noted that local directories accessible through supported interfaces 1609 (discussed further below in association with FIG. 16) may reside in FLASH 2712. It is further noted that one or more applications 2711 may reside in FLASH 2712, Random access memory (RAM) 2709 and disk adapter 2707 may also be coupled to system bus 2713. It should be noted that software components including operating system 2710 and application 2711 may be loaded into RAM 2709 which may be IP phone's 101 main memory. Disk adapter 2707 may be an integrated drive electronics ("IDE") adapter that communicates with a disk unit 2708, e.g., disk drive. It is noted that the applications mentioned above may reside in disk unit 2708. It is further noted that local directory accessible via supported interfaces 1609 (discussed further below in association with FIG. 16) may reside in disk unit 2708.

Returning to FIG. 27, in conjunction with FIG. 1, communications adapter 2705 may also be coupled to system bus 2713. Communications adapter 2705 may interconnect bus 2713 with an outside network 2704 enabling IP phone 101 to communicate with data network 102, servers 106, 107, 108, 109, 110, analog phones 113 via PSTN 105, mobile phone 115 via mobile network 114, etc.

Returning to FIG. 27, in conjunction with FIG. 2, other devices 2703 may be integrated into the system bus 2713 via miscellaneous input/output (I/O) ports 2706.

Implementations of the invention include embodiments as a VoIP phone (IP phone) programmed to execute the method or methods described herein, and as a computer program product. According to the implementations, sets of instructions for executing the method or methods may be resident in the random access memory 2709 of one or more systems configured generally as described above. Until required by IP phone 101, the set of instructions may be stored as a computer program product in another computer memory, for example, in disk unit 2708. Furthermore, the computer program product may also be stored at another computer and transmitted when desired to the IP phone 101 by a network or by an outside network 2704 such as the Internet. One skilled in the art would appreciate that the physical storage of the sets of instructions physically changes the medium upon which it is stored so that the medium carries computer readable information. The change may be electrical, magnetic, chemical or some other physical change.

IP phone 101 includes a software platform with multiple layers adaptable to be used with different applications operating on IP phone 101 as well as adaptable to using different communication infrastructures. An embodiment of such a software platform is provided below in association with FIG. 3.

Figure 3:
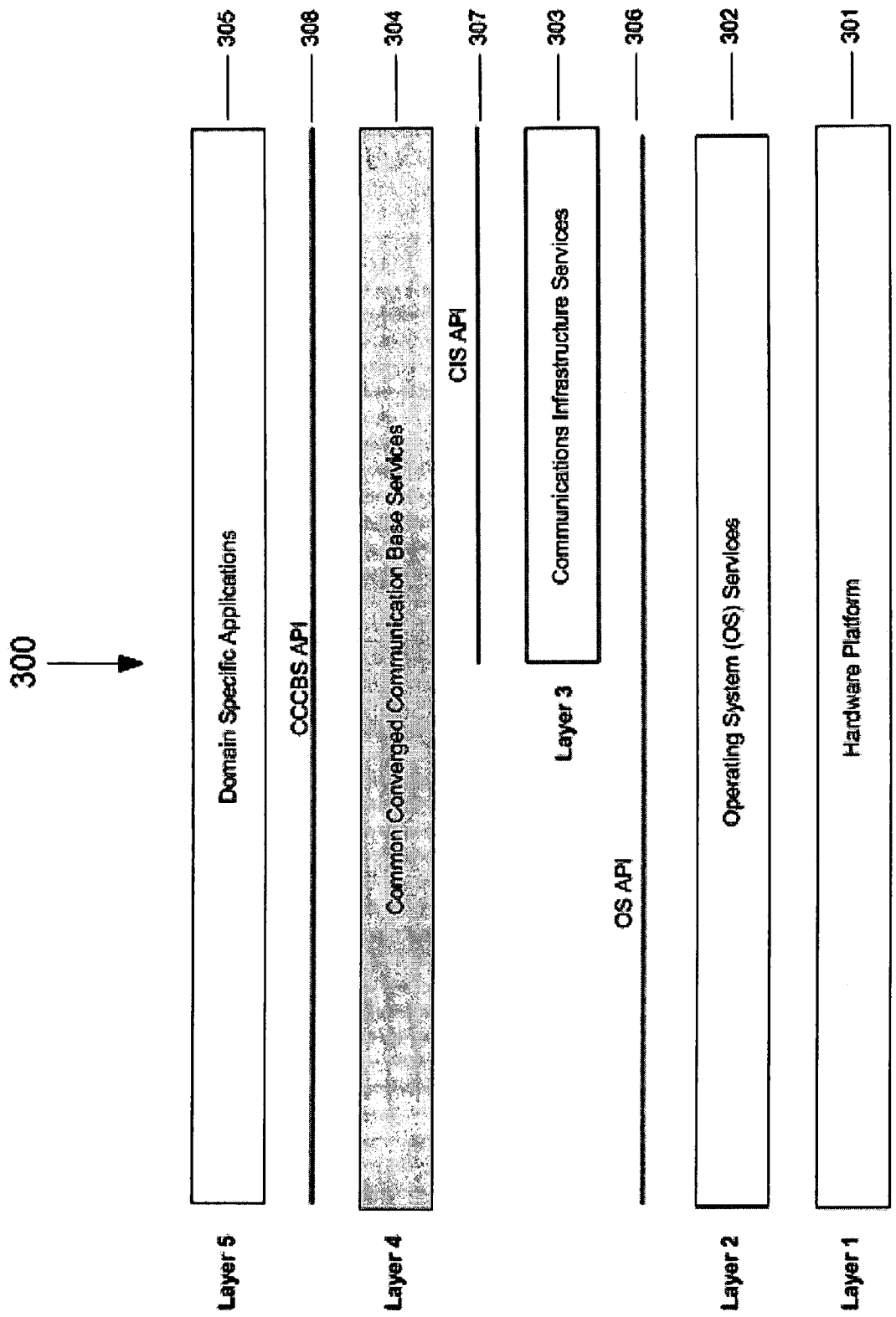
FIG. 3 illustrates the software platform of the IP phone in accordance with an embodiment of the present invention.

Referring to FIG. 3, platform 300 of IP phone 101 may include five layers. Layer 1 (hardware platform) 301 of platform 300 may include software to control the physical embodiment of IP phone 101. The physical embodiment includes, but is not limited to, Application-Specific Integrated Circuits (ASICs), processing elements, Input/Output (I/O) devices, peripherals, and storage elements.

Layer 2 (operating system services) 302 of platform 300 provides an interface to access operating system (OS) services and hardware platform devices. Layer 2 302 provides an execution environment for the software modules and a hardware abstraction layer. Among the responsibilities of layer 2 302 include implementing common OS services such as memory management, task management, date and time information, and access to peripherals; providing file system services to emulate hard disk drive on flash memory devices; providing a Transport Control Protocol/Internet Protocol (TCP/IP) networking API and the implementation of other required protocols such as Dynamic Host Configuration Protocol (DHCP), Trivial File Transfer Protocol (TFTP), Simple Network Time Protocol (SNTP) and Simple Network Management Protocol (SNMP); providing an embedded web server implementation that allows remote configuration through a web browser; implementing core graphics functionality for drawing, window management, event routing, fonts and bitmaps; and, implementing hardware drivers for each of the converged communication terminal's 101 peripherals.

Figure 4:
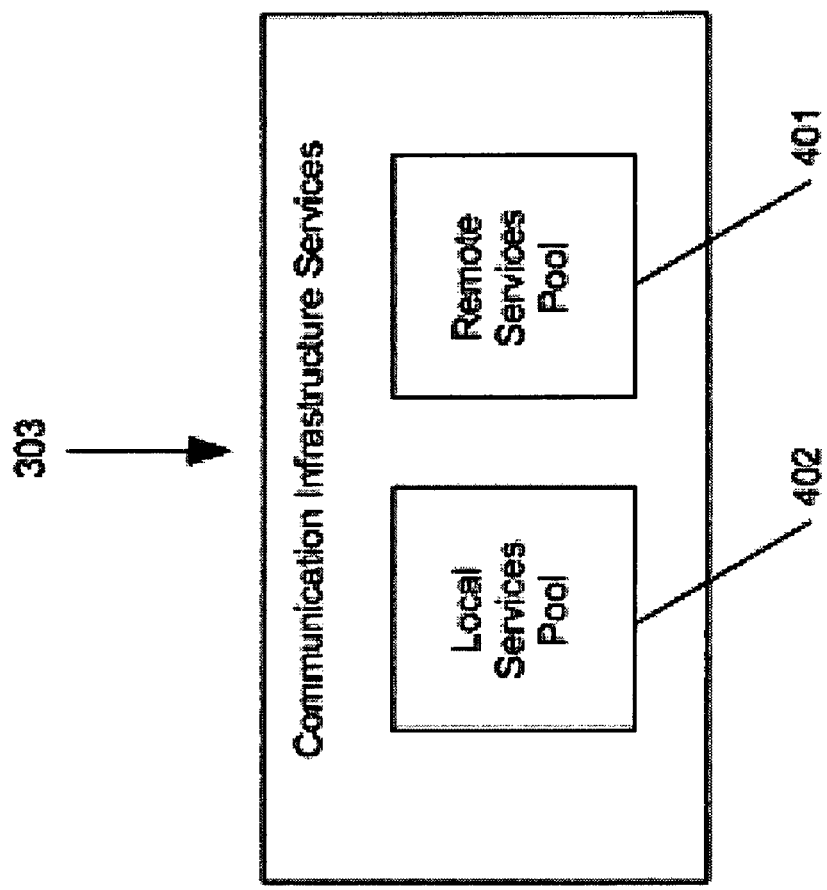
FIG. 4 illustrates an embodiment of the present invention of the communication infrastructure services layer of the software platform of the IP phone.

Layer 3 (communications infrastructure services) 303 of platform 300 may be configured to interface with multiple communication infrastructures. Layer 3 303 of platform 300 contains a local services pool and a remote services pool, as illustrated in FIG. 4. It is important to note that system 100 (FIG. 1) contains a basic set of telephony features provided by a Common Converged Communication Base Services (CCCBS) layer 304, as discussed below, which makes serverless communications straightforward as there is no reliance on the server/proxy for such features.

FIG. 4 illustrates an embodiment of the present invention of layer 3 303. Referring to FIG. 4, in conjunction with FIGS. 1 and 3, layer 3 303 may include a remote services pool 401. Remote services pool 401 refers to components that do not reside locally on IP phone 101, but rather on telephony services 109 or PSTN 105 with which IP phone 101 may have to collaborate to provide extended communications features and converged voice/data/video services and/or interface with proprietary IP PBXs 107, application servers 108 and PSTN elements such as centrex, call managers and softswitches. For every specific external collaborating entity, there might be an adapter module that implements all or part of the functionality exposed by a Communication Infrastructure Services (CIS) API 307, as discussed below.

Layer 3 303 may further include a local services pool 402. Local services pool 402 refers to components that reside on IP phone 101 and can provide an interface to communicate and collaborate with proprietary IP PBXs 107, application servers 108 and PSTN 105 elements such as centrex, call managers and softswitches. While the vendor-specific interface implementation could reside locally or remotely on a network server or switch, the advantage of implementing this component on a network server or switch and leaving locally only a proxy to those services is that the need to create a new converged communications terminal 101 image for each change in an external component may be avoided. In addition, the gateway implementation may not be constrained by the (possibly) limited IP phone 101 resources.

Returning to FIG. 3, platform 300 includes a layer 4 (common converged communications base services) 304. Layer 4 304 includes communications (telephony) specific services as well as other data services commonly that may be required by domain-specific converged communication applications (referring to applications operating on IP phone 101), as illustrated in FIG. 5.

Figure 5:
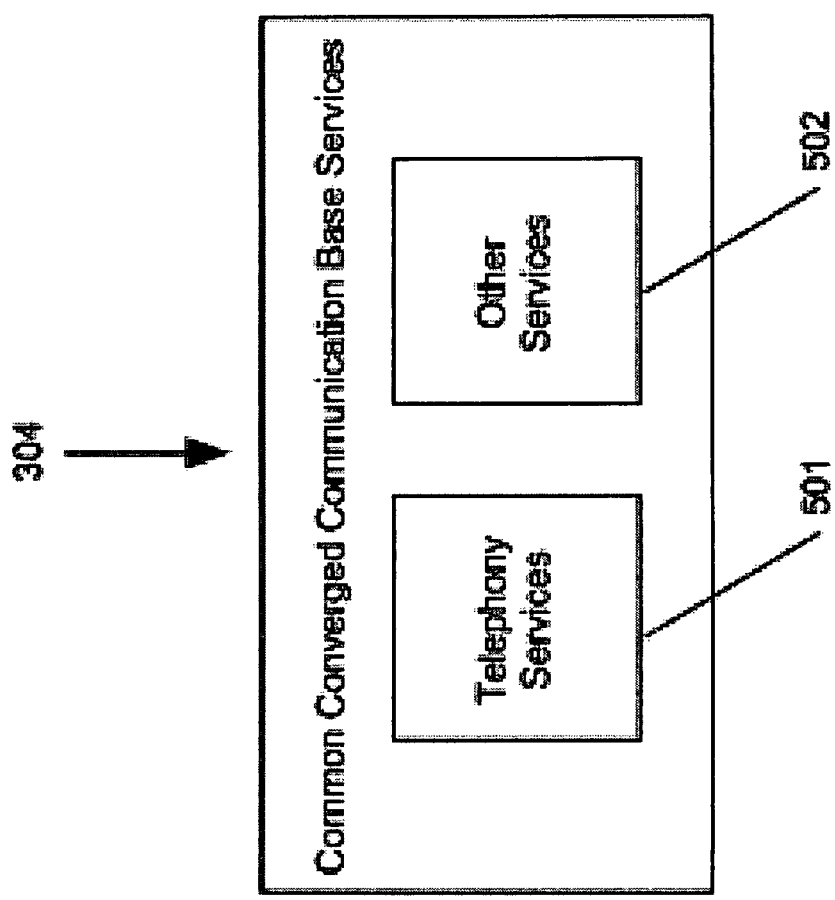
FIG. 5 illustrates an embodiment of the present invention of the common converged communication base services layer of the software platform of the IP phone.

FIG. 5 illustrates an embodiment of the present invention of layer 4 304. Referring to FIG. 5, layer 4 304 includes telephony services 501. Telephony services 501 include call processing functions that implement the core functionality to initiate, terminate and manage phone calls over VoIP and/or POTS communication infrastructures. Layer 4 304 may further include an implementation of signaling, media transport, voice processing and call control functionality. Among the responsibilities of these functions are: providing basic call control features; providing call setup and tear down functionality through protocols like Session Initiation Protocol (SIP), H.323, Media Gateway Control Protocol (MGCP) and others; providing media transport and signaling through protocols like Real-Time Protocol (RTP) and Real-Time Control Protocol (RTCP); providing voice processing features (echo cancellation, Voice Activity Detection (VAD), jitter buffering, etc); and notifying call-related events to the upper layer.

Layer 4 304 may further include other services 502, such as data services. Services 502 may include Hyper-Text Transfer Protocol (HTTP) clients, Remote Procedure Call/Simple Object Access Protocol (RPC/SOAP), eXtensible Markup Language (XML) parser, directory services, configuration, Personal Computer/Personal Data Assistant (PC/PDA) synchronization, and user interface. HTTP client services provide a transport protocol to store and retrieve from server objects such as XML documents and images and play an important role in IP communications and application development, therefore enabling converged communications terminal 101 to participate in web-centric architectures. RPC/SOAP services, implement an interface to make remote procedure calls. Remote procedure calls allow IP phone 101 to send requests to and receive responses from components in the computer network. SOAP is an implementation of RPC that uses XML to format request/response information and HTTP to transport this information. Providing support for SOAP enables IP phone 101 to participate in web services. XML parser services translate data represented in XML format into internal data structures and requests for services. Structuring documents using XML allows sharing of information between different platforms and applications. In IP phone 101 there are at least three applications for XML: to describe the user interface layout and components, to make remote procedure calls and to format configuration files. Light-weight Directory Access Protocol (LDAP) provides an interface to access information in directory servers. Directory services are commonly used to carry out three main requirements of Internet Protocol (IP) telephony: authentication, personalization and white pages. Configuration services allow for the management of IP phone 101 settings such as: device ID, network, dial-plans, audio (codecs, Dual Tone Multi-Frequency (DTMF), voice processing), call control, SIP related parameters, volume, display, date/time, authentication, security, voice mail, phone book, ringer behavior, power management, language, peripherals, and software management. These services also implement routines for automatic retrieval of phone configuration and software upgrades from a server. PC and PDA communications services provide an interface to communicate and collaborate with external user devices such as the PC and PDA. IP phone 101 should collaborate closely with these devices to share information, keep that information synchronized, and accomplish tasks more effectively.

Returning to FIG. 3, platform 300 includes a layer 5 (domain-specific applications) 305. Layer 5 305 implements the business logic and the presentation logic used to run applications operating on IP phone 101 as illustrated in FIG. 6.

Figure 6:
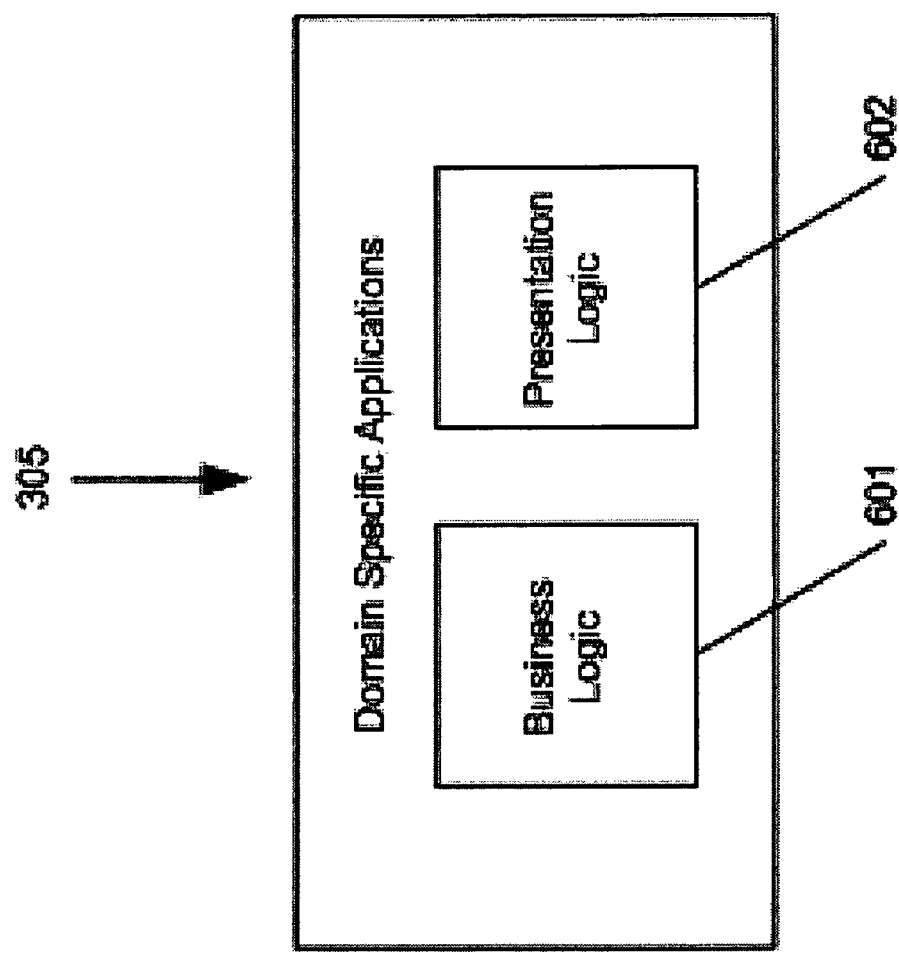
FIG. 6 illustrates an embodiment of the present invention of the domain-specific application layer of the software platform of the IP phone.

FIG. 6 illustrates an embodiment of the present invention of layer 5 305. Referring to FIG. 6, layer 5 305 includes business logic 601 that provides the mechanisms to combine the services provided by underlying modules into coherent applications that add some value to the end user. Some components of business logic 601 may run locally on IP phone 101 and some components will run remotely in an application server 108 (FIG. 1). Some examples include extended calling features, phone directories, management and diagnostic tools, unified messaging, intelligent call management, instant messaging, contact management, personalized ring tones, call tracking, remote collaboration tools, and industry specific applications. It is at this layer that domain-specific differentiating features are implemented.

Layer 5 305 further includes presentation logic 602 that responds to the fact that the primary concerns of the User Interface (UI) module are the mechanisms of user interaction and how to lay out an appropriate presentation to the user in contrast with the primary concerns of business logic 601 are application domain policies and persistent storage interactions. The UI module may change according to customer's needs without changing the applications core functionality. For example, the same application domain modules with rich, web-based or text-based clients could be reused. Furthermore, the application module can be tested independently without resorting to awkward Graphical User Interface (GUI) scripting tools.

Layer 4 304 may be leveraged in the design of differentiated IP phones 101 via the following APIs. An operating system services API 306 provides common methods to access services provided by the operating system. For each specific operating system there is a module that supports the abstraction.

A Communication Infrastructure Services (CIS) API 307 provides common methods to access converged communication services available via the installed infrastructure. For each vendor-specific infrastructure there will be a module that will support the abstraction.

A Common Converged Communication Base Services (CCCBS) API 308 provides a standard method to access common converged communication services previously developed to satisfy a broad-range of converged communication domain-specific applications.

Platform 300 may be used to develop domain-specific applications (specific applications operating on IP phone 101) for converged communication devices, to retarget one or more domain-specific applications developed for a specific IP phone 101 to a new hardware platform and/or operating system and/or communications infrastructure.

Figure 7:
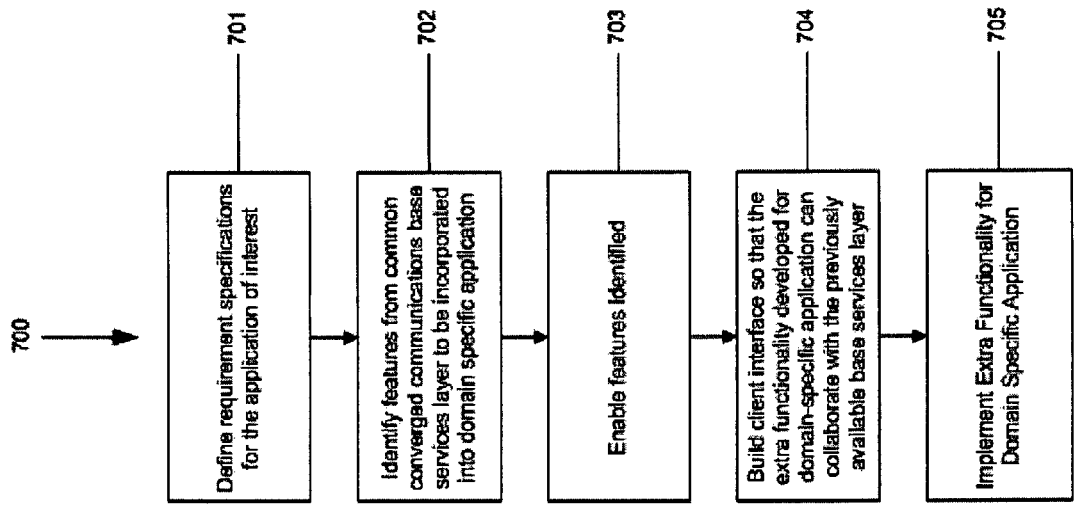
FIG. 7 is a flowchart of a method for developing domain-specific applications for converged communication terminals (IP phones) based on the software platform in accordance with an embodiment of the present invention.

The method by which domain-specific applications for IP phones 101 may be rapidly developed based on the flexible software platform 300 previously described is presented schematically in FIG. 7. FIG. 7 illustrates a method 700 for the development of domain-specific applications for converged communication terminals (IP phones 101) based on software platform 300 (FIG. 3) in accordance with an embodiment of the present invention.

Referring to FIG. 7, in conjunction with FIGS. 1-3, in step 701, the requirement specifications for the application of interest are defined. In step 702, the modules from common converged communications base services layer 304 to be incorporated into domain-specific application 305 is identified. Once these services are identified, these features are enabled in base services layer 304 in step 703. In step 704, a client interface is built so that the extra functionality developed for domain-specific application 305 can collaborate with the previously available base services layer 304. In step 705, any extra functionality that is not covered by base services 304 that is required for the domain-specific application of interest 305 is implemented. Method 700 leverages CCCBS API 308.

It is noted that method 700 may include other and/or additional steps that, for clarity, are not depicted. It is further noted that method 700 may be-executed in a different order than presented and that the order presented in the discussion of FIG. 7 is illustrative. It is further noted that certain steps in method 700 may be executed in a substantially simultaneous manner.

Figure 8:
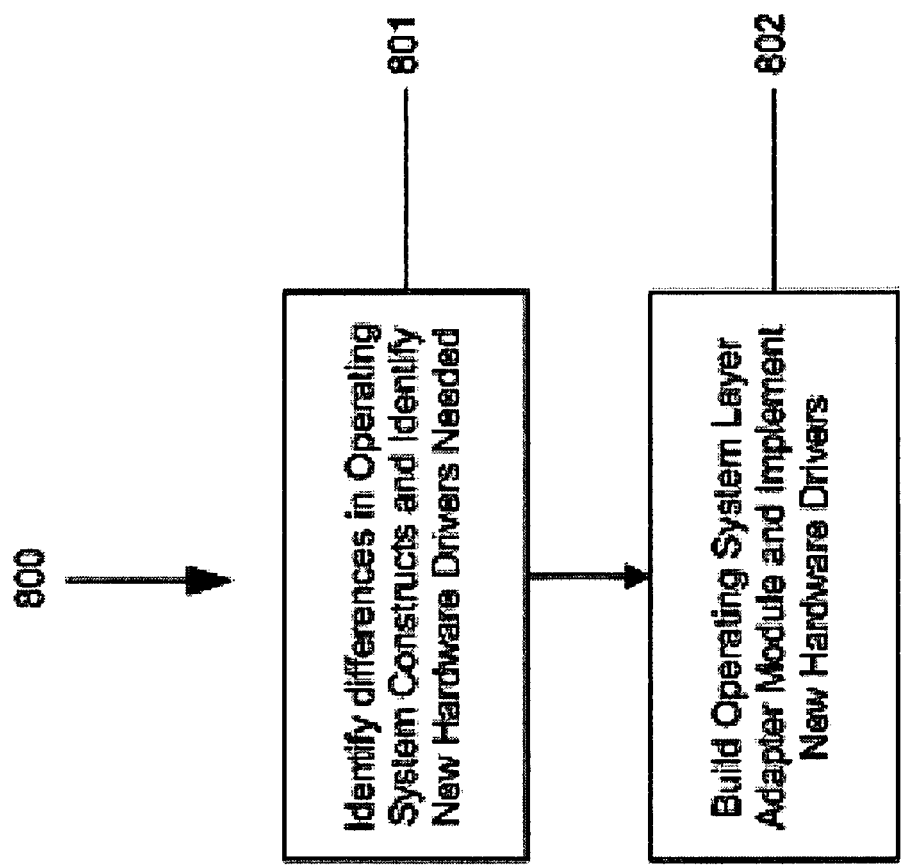
FIG. 8 is a flowchart of a method by which one or more domain-specific applications developed for a specific IP phone are rapidly retargeted to a new hardware platform and/or operating system based on the software platform in accordance with an embodiment of the present invention.

The method by which one or more domain-specific applications developed for a specific IP phone 101 (FIGS. 1-3) may be rapidly retargeted to a new hardware platform and/or operating system based on the flexible software platform 300 (FIG. 3) previously described is presented schematically in FIG. 8. FIG. 8 illustrates a method 800 by which one or more domain-specific applications developed for a specific IP phone 101 may be rapidly retargeted to a new hardware platform and/or operating system based on the flexible software platform 300 in accordance with an embodiment of the present invention.

Referring to FIG. 8, in conjunction with FIGS. 1-3, in step 801, the differences between constructs of the original and the new operating systems are identified. Further, any new hardware drivers that would be needed are identified. Once these have been identified, an operating system services layer adapter module is built as part of API 306 for the new operating system and the implementation of the new hardware drivers in step 802. Method 800 leverages the operating system services API 306.

It is noted that method 800 may include other and/or additional steps that, for clarity, are not depicted. It is further noted that method 800 may be executed in a different order than presented and that the order presented in the discussion of FIG. 8 is illustrative. It is further noted that certain steps in method 800 may be executed in a substantially simultaneous manner.

Figure 9:
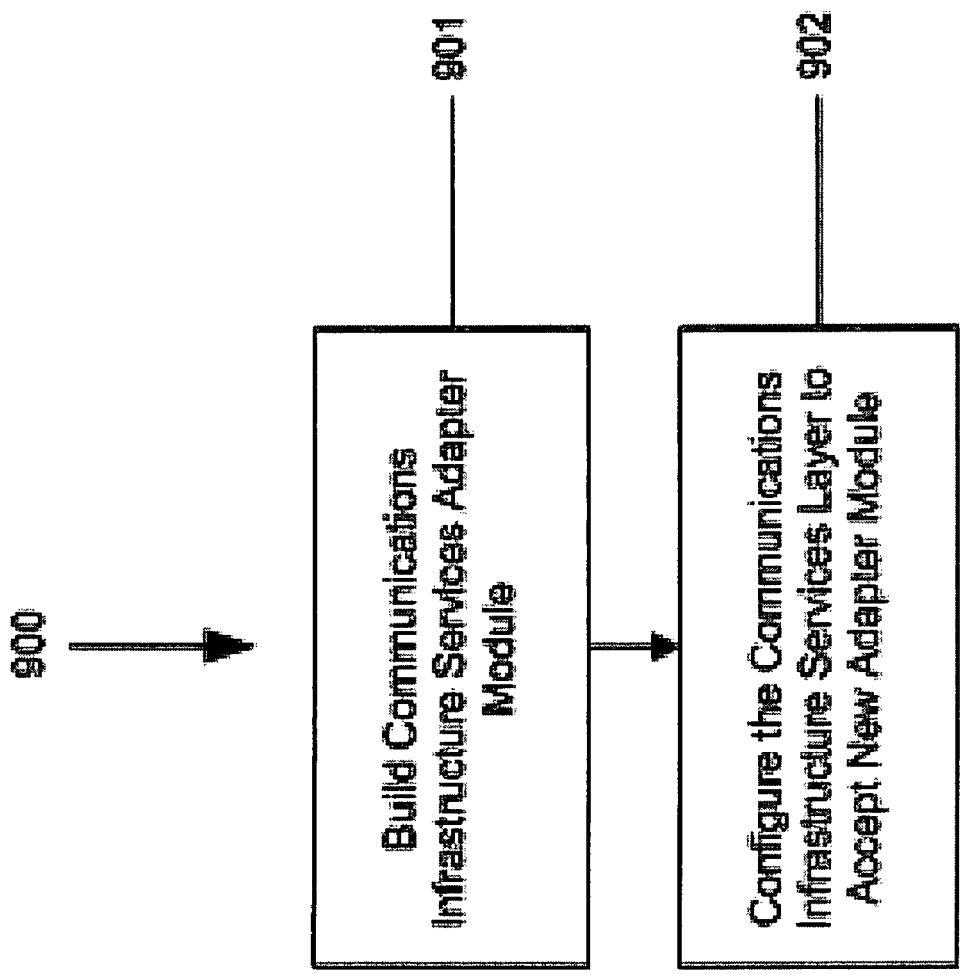
FIG. 9 is a flowchart of a method by which one or more domain-specific applications developed for a specific IP phone are rapidly retargeted to a new communications infrastructure based on the software platform in accordance with an embodiment of the present invention.

The method by which one or more domain-specific applications developed for a specific IP phone 101 (FIGS. 1-3) may be rapidly retargeted to a new communications infrastructure based on the flexible software platform 300 (FIG. 3) previously described is presented schematically in FIG. 9. FIG. 9 illustrates a method 900 by which one or more domain-specific applications developed for a specific IP phone 101 may be rapidly retargeted to a new communications infrastructure based on the flexible software platform 300 in accordance with an embodiment of the present invention.

Referring to FIG. 9, in conjunction with FIGS. 1-3, in step 901, an adapter module for the new communications infrastructure services layer 303 on which IP phone 101 will be deployed is built. In step 902, communications infrastructure services layer 303 is configured to accept the new module and to have it collaborate with pre-existing modules. Method 900 leverages operating system services API 306 and communications infrastructure services API 307.

It is noted that method 900 may include other and/or additional steps that, for clarity, are not depicted. It is further noted that method 900 may be executed in a different order than presented and that the order presented in the discussion of FIG. 9 is illustrative. It is further noted that certain steps in method 900 may be executed in a substantially simultaneous manner.

Figure 10:
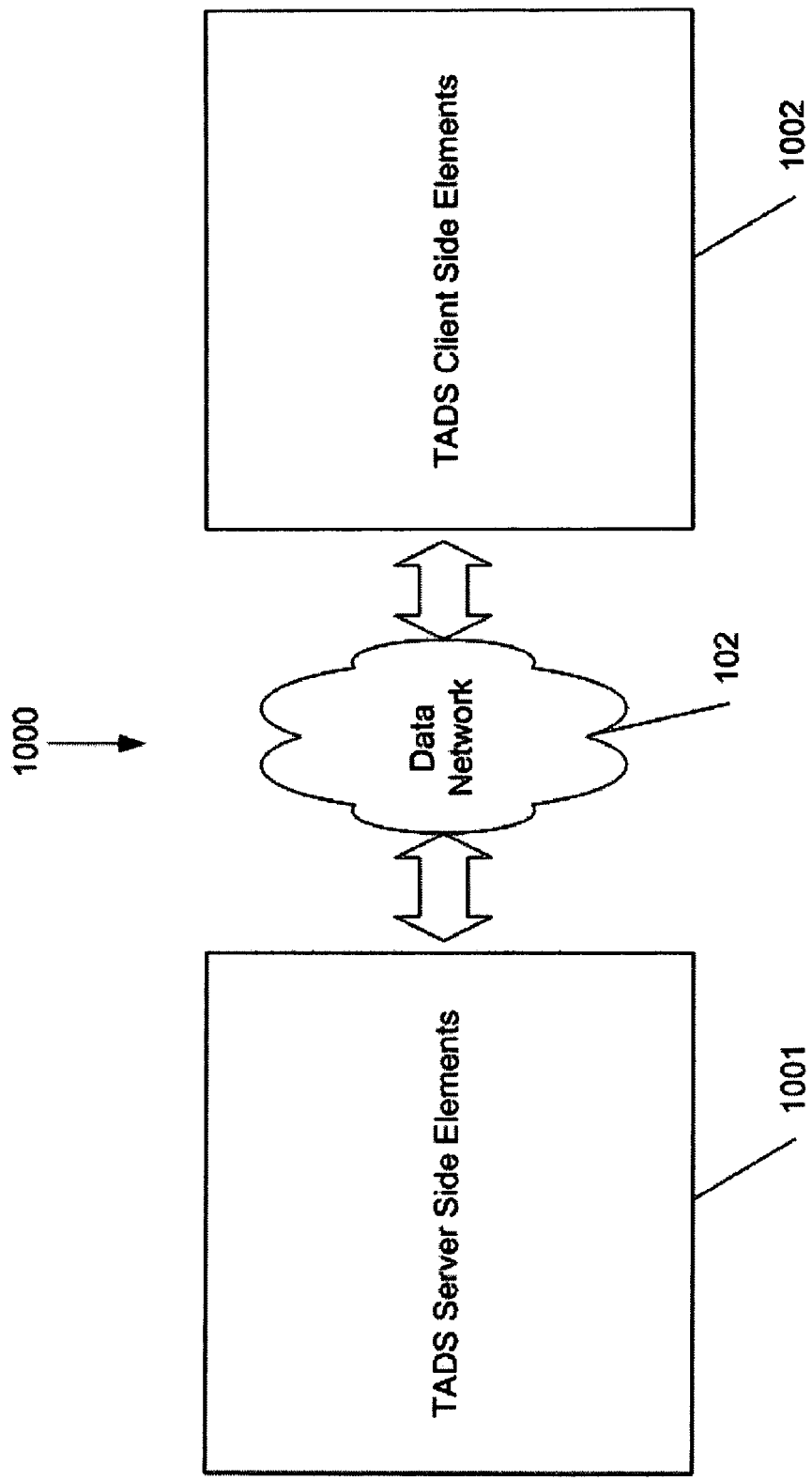
FIG. 10 illustrates an embodiment of the present invention of a client-server Transaction Applications Delivery Services (TADS) communications architecture.

An embodiment of a client-server communications architecture for which software platform 300 (FIG. 3) and methods described above can be used to develop client converged communication terminal devices 101 that can support the distribution of value-added services to end-users is illustrated in FIG. 10. FIG. 10 illustrates an embodiment of the present invention of a client-services communications architecture 1000 for which software platform 300 and methods described above can be used to develop client converged communication terminal devices 101 that can support the distribution of value-added services to end-users.

Referring to FIG. 10, client-services communications architecture 1000 forms the basis of a Transactional Application Delivery System (TADS) for service providers and/or third party developers and content providers to rapidly develop, deliver, and manage revenue generating and productivity enhancing data-voice applications for IP phones 101. Data-voice applications are those that take advantage of voice over Internet Protocol (VoIP) and/or POTS/Broadband infrastructures.

As illustrated in FIG. 10, TADS server side elements 1001 communicate with TADS client side elements 1002, e.g., IP phones 101, via data network 102, e.g., Internet. Client-services communications architecture 1000 has built-in flexibility allowing it to evolve with advancements in hardware, software, protocols, thus providing an extensive platform for delivery of applications and content. The following are among the main characteristics of software platform 300 (client-services communications architecture 1000).

TADS 1000 provides an integrated download and content management system which enables the delivery of software and content to enabled devices. This download manager supports the entire process of software provisioning, including the submission of content and applications from third-party developers, testing and certification of those applications, bundling, pricing, demographics-based targeted promotions, and delivery to enabled terminals.

TADS 1000 further includes the capability to remotely, provision, configure, or upgrade compatible devices. This enables providing online help support to users and reducing the need for on premise visits. Through this capability, service providers are able to bring up new clients, push the latest software updates to the terminals, or remotely perform a move, add, or change to a customer's system.

TADS servers 1001 may process all voice and data before transmitting to the device. TADS servers 1001 communicate with TADS client side elements 1002 to determine the optimal delivery, compression, and formatting of the information to be displayed on IP phone 101. This content optimization will maximize the service providers use of available device resources ate at the customer's premise.

TADS 1000 further includes the capability of using open standard interfaces to enable quick and easy integration with a carrier's existing systems and third party equipment and software.

Furthermore, all software components of TADS 1000 incorporate redundancy and load balancing to provide a very high level of service availability. To enable carrier grade reliability, TADS servers 1001 route all voice and data traffic to other servers should it encounter any hardware or software failures. TADS 1000 provides scalability simply through the addition of servers. A more detailed description of TADS 1000 is provided below in association with FIG. 11.

Figure 11:
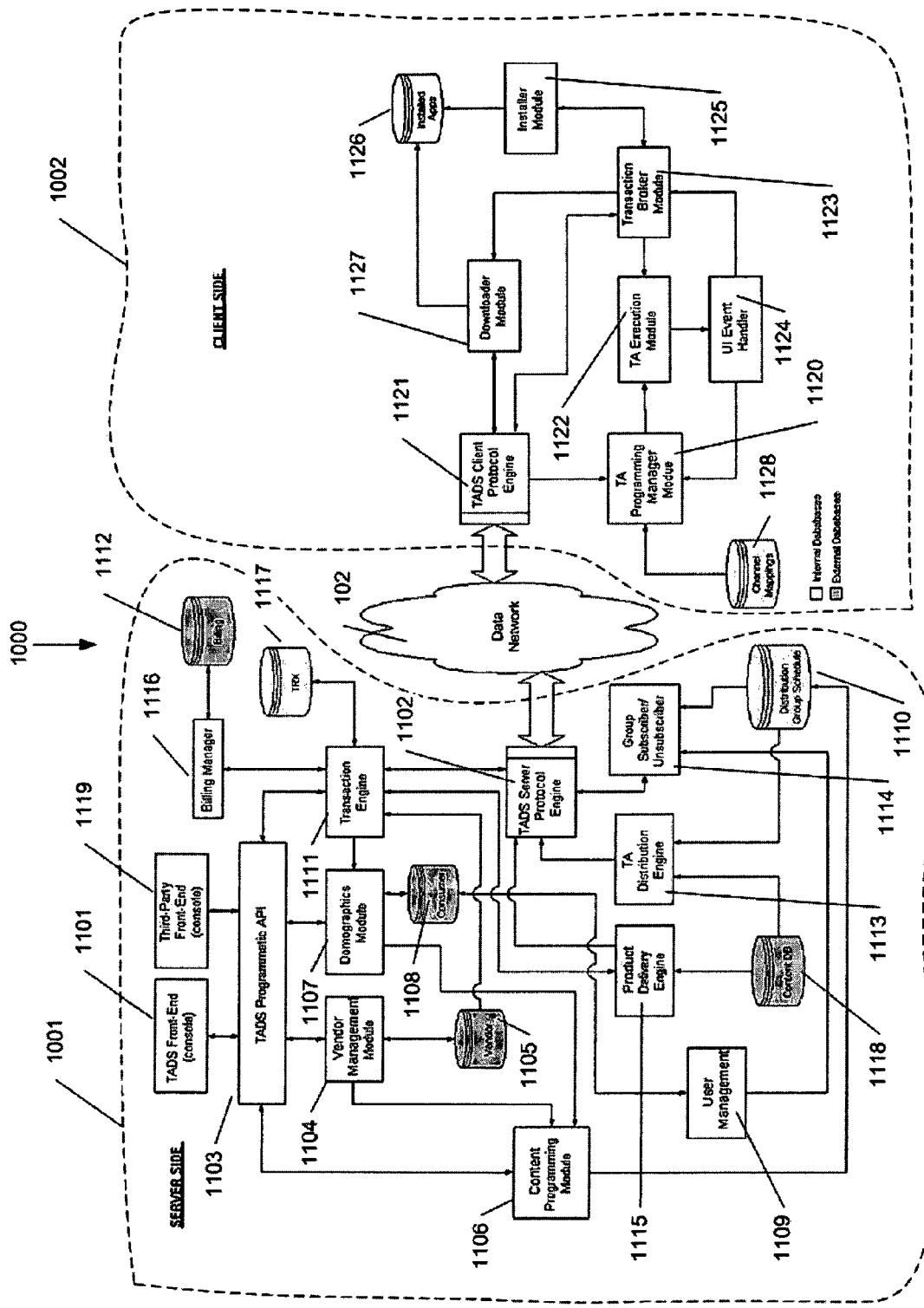
FIG. 11 illustrates an embodiment of the present invention of the server and client sides of a transactional application delivery system.

FIG. 11 illustrates an embodiment of the present invention of the server and client sides of TADS 1000. Referring to FIG. 11, TADS 1000 includes a server side 1001 (FIG. 10) and a client side 1002 (FIG. 10). It is noted that TADS server 1001 refers to server 108 (FIG. 1) and that TADS client side elements 1002 refer to IP phone 101 (FIGS. 1-3).

TADS server side elements 1001 include a front-end console 1101 that allows merchants to submit to a content distribution platform 1204 (FIG. 12 which will be discussed below), via a web-based interface (not shown), multi-media advertising content, define the demographic characteristics of the target audience, schedule the dates and times when advertisements from third parties should be distributed, and pay for the service. A third-party may develop an alternate front-end console 1119 that may extend upon front-end console 1101.

TADS server side elements 1001 further include a TADS server protocol engine 1102 that handles all communications using the TADS protocol on the server side for handling transactions, distributing advertisements, subscribing clients to distribution groups and delivering products to clients.

TADS server side elements 1001 further include various server software modules and databases (discussed below) on top of which telephony applications and converged voice-data applications and services may be constructed. TADS server side elements 1001 further include a settlement manager 1302 (FIG. 13 which will be discussed below) that maintains a log of all end-user actions during a converged communications session that can then be used to determine profit allocation throughout the value chain (merchants, content providers, service providers, and the owner of the content distribution platform) as well as to obtain valuable closed activity reports that may be used to drive new services and log valuable demographic data on all end-user transactions.

Referring to FIG. 11, TADS front-end (console) 1101 may be configured to be a front-end to the Transactional Applications Delivery System (TADS) programmatic API 1103. TADS front-end (console) 1101 presents a selective view of all the data accessible to programmatic API 1103. This includes custom graphical user interfaces, web-based interfaces, command line interfaces, and others. Customized front-ends can be developed by third-parties also.

TADS programmatic APIs 1103 expose all aspects of the TADS framework to calling applications. This includes browsing (read, write, delete, add) information on consumers, vendors, billing, channel definitions, transactions, content and distribution groups.

TADS server side elements 1001 further include a vendor management module 1104 configured to allow access to a vendor database 1105. Vendor management module 1104 may be an adapter to communicate with an existing system or internal vendor database 1105. All the information regarding vendors is stored and accessed through vendor management module 1104. Vendor management module 1104 can be used by a content programming module 1106 to get vendor information. Vendors are clients of the service provider. They buy advertisement space/time on IP phone 101 and get orders from customers through IP phone 101.

TADS server side elements 1001 further include a demographics module 1107 configured to access a consumer database 1108 and apply rules to query records that show specific demographic characteristics. Demographics module 1107 may further include an adapter to communicate with an existing system or an internal consumer database 1108.

TADS server side elements 1001 further include a user management module 1109. Users of TADS-enabled clients may be regarded as consumers by the vendors using TADS. Users can be added, changed or deleted through the use of user management module 1109. All information regarding users is accessed through user management module 1109.

TADS server side elements 1001 further include content programming module 1106, as mentioned above. Content programming module 1106 is involved in defining the distribution and exposition of advertisements throughout the network of TADS-enabled clients, e.g., IP phone 101. Advertisements are exposed at the remote clients by the transactional applications distributed by TADS server 1001. Vendors can use the graphical user interface exposed by TADS front-end 1101 to access content programming module 1106. Content programming module 1106 may be used to create distribution groups for advertisements and to schedule showing time among the clients in the group. Vendors can define distribution and level of exposure for an advertisement using criteria such as user demographics, geographical or organizational boundaries and buying history. The resulting scheduling information is stored in a distribution group schedule database 1110.

TADS server side elements 1001 further include a transaction engine 1111. Transaction engine 1111 is an engine that autonomously handles transactions from TADS client side elements 1002. Transaction engine 1111 may be configured to keep records of all transactions handled. Transaction engine 1111 may also access a billing database 1112 (or an external billing system). Transaction engine 1111 can also change consumer database 1108 to reflect particular information about consumer buying behavior in consumer database 1108. Transactions are started by TADS client side elements 1002. A transaction starts with a consumer selecting an advertisement on TADS client side elements 1002. Client and server exchange purchase order details and after the order is confirmed the product is delivered (when appropriate) over network 102. A transaction ends when the product is delivered to the TADS-enabled device, e.g., IP phone 101.

TADS server side elements 1001 further include TADS server protocol engine 1102, as mentioned above. TADS server protocol engine 1102 may be configured to handle all communications using the TADS protocol on the server side. The TADS communication protocol is used for handling transactions, distributing advertisements, subscribing clients to distribution groups and delivering products to TADS client side elements 1002.

TADS server side elements 1001 further include a Transactional Applications (TA) distribution engine 1113. TA distribution engine 1113 may be used to distribute Transactional Applications (TA) to TADS client side elements 1002, e.g., IP phones 101. TA distribution engine 1113 may be configured to look up the scheduling database for TAs to distribute and to use TADS protocol engine 1102 to send them to the appropriate destinations. Destinations are defined as groups of TADS client side elements 1002 that have been identified as having the appropriate channels to handle the TA to be sent. Transactional applications are chartered with the task of advertising a product and completing a sell transaction from a network of TADS client side elements 1002.

TADS server side elements 1001 further include a group subscription manager module 1114 configured to handle the subscription and un-subscription of TADS client side elements 1002 for each distribution group. A distribution group contains an identifier for each of TADS client side elements 1002 that are members of the group. Subscription can take place at client registration time or it can be initiated by the server whenever a TA is scheduled for distribution. The subscription process delivers scheduling information for a TA to TADS client side elements 1002.

TADS server side elements 1001 further include a product delivery engine 1115 configured to assist transaction engine 1111 to complete a sale by delivering a product purchased to TADS client side elements 1002 whenever possible.

TADS server side elements 1001 further include a billing manager module 1116 used to access billing information. Billing manager module 1116 may include an adapter to communicate with an external billing system or internal billing database 1112.

Billing database 1112 may contain information on sales done on behalf of vendors through TADS and TA distribution charges. Vendors are billed by service providers for their use of TADS.

Other databases in TADS server side elements 1001 include a transaction database 1117 configured to contain records of all transactions enabled by TADS.

Another database in TADS server side elements 1001 is vendor database 1105, as mentioned above. Vendor database 1105 contains vendor information.

Another database in TADS server side elements 1001 is consumer database 1108, as mentioned above. Consumer database 1108 contains all information related to consumers. Consumers are the users of TADS client side elements 1002.

Another database in TADS server side elements 1001 is distribution group schedule database 1110, as mentioned above. Distribution group schedule database 1110 contains information on what devices should get what TAs and at what times they should be shown.

Another database in TADS server side elements 1001 is a content database 1118. Content database 1118 contains products and TAs to be delivered by TADS server 1001.

Referring to FIG. 11, elements of TADS client 1002 include a TA programming manager module 1120 configured to receive subscription requests from servers through a TADS client Protocol Engine 1121. TA programming manager module 1120 may be configured to keep track of what TAs are expected through each channel at specific times and where in the phone user interface they should be rendered.

TADS Client Protocol Engine 1121 may be configured to handle all communications using the TADS protocol in each client. The TADS communication protocol is used for handling transactions, distributing advertisements, subscribing clients to distribution groups and delivering products to client side elements 1002.

Client side elements 1002 may further include a TA execution engine 1122 configured to execute a TA at the client, e.g., IP phone 101. The TA uses a transaction broker module 1123 to engage in transactions with TADS server 1001. TA execution engine 1122 also renders advertisements on the user interface of the TADS client side elements 1002, e.g., IP phone 101.

Client side elements 1002 may further include a UI event handler 1124. UI event handler 1124 is not provided by the TADS framework. It is part of the infrastructure of TADS client side elements 1002. UI event handler 1124 gets events from the UI of TADS client side elements 1002, e.g., IP phone 101, and forwards them to transaction broker module 1123 and TA execution engine 1122.

Transaction broker module 1123 interacts with transaction engine 1122 at TADS server 1001 through TADS client protocol engine 1121. Transaction broker module 1123 helps TAs to complete transactions.

Client side elements 1002 may further include a product installer module 1125 configured to install products in database 1126 delivered through the TADS framework.

Client side elements 1002 may further include a product downloader module 1127 which interacts with the product delivery engine at TADS server 1001 through TADS client protocol engine 1121. Product downloader module 1127 downloads products purchased through TADS.

Client side elements 1002 may further include a group and channel bindings database 1128 which contains information on what TAs will be delivered through each distribution group and when and where in the UI their advertisements will show up.

Installed applications database 1126, as mentioned above, will hold all applications installed through TADS.

It is noted that the embodiment of the server and client sides of TADS 1000 may include other and/or additional modules that for clarity are not depicted. It is further noted that TADS 1000 may be implemented with a different combination of modules and that those presented in the discussion of FIG. 11 are illustrative.

An embodiment of the present invention related to the development of a series of end-to-end services and methods that enable directory search and advertising service delivery to IP phones 101 via a content distribution platform that allows consumers, businesses, content owners, and service providers to leverage the benefits of converged data-voice applications based on the TADS building blocks discussed above and software platform 300 (FIG. 3) is discussed below in association with FIG. 12.

Figure 12:
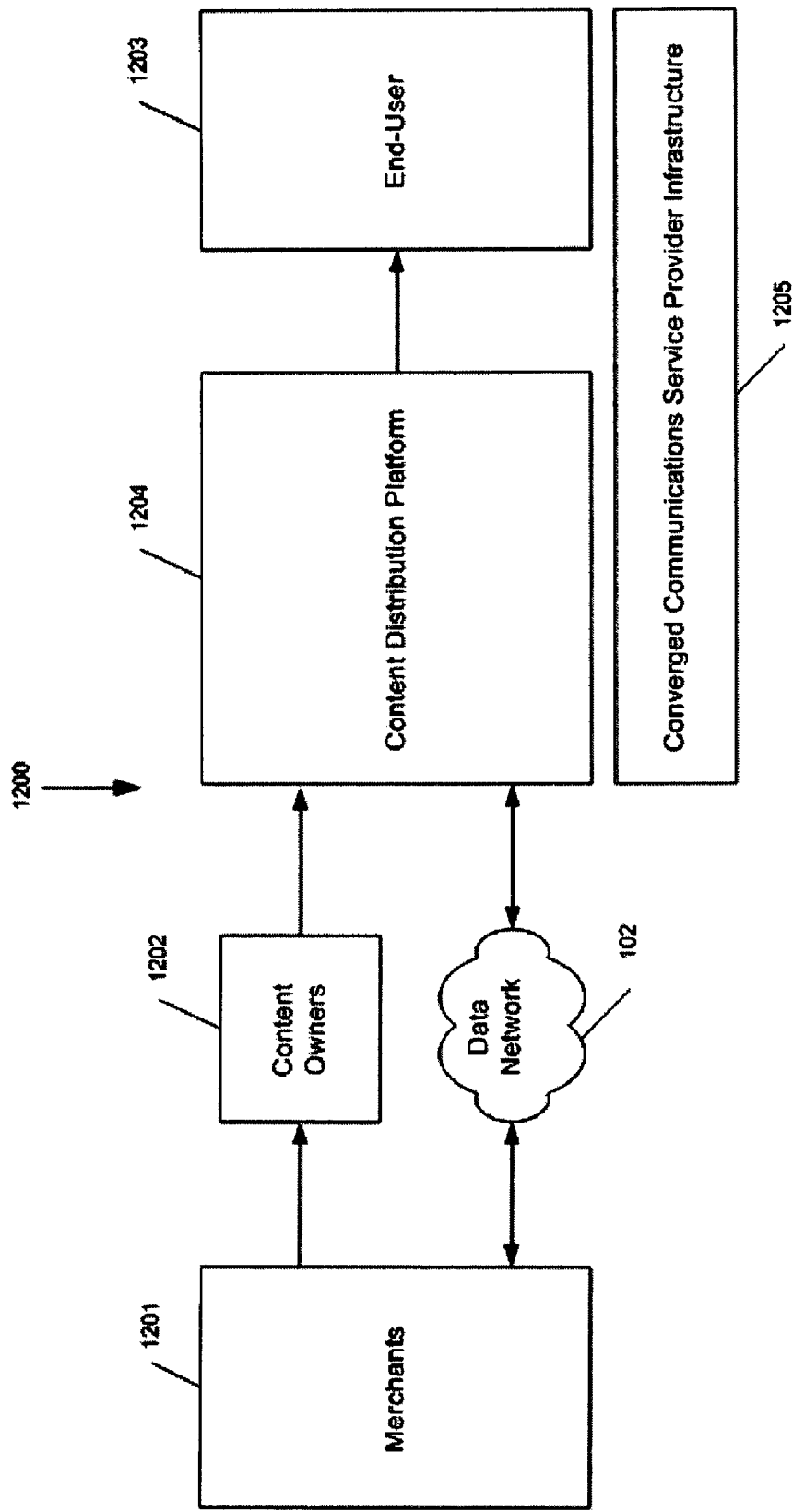
FIG. 12 illustrates an embodiment of the present invention of end-to-end services that enable contextual search and advertising service delivery to IP phones.

FIG. 12 illustrates an embodiment of the present invention of a converged communications content distribution architecture 1200 with end-to-end services that enable directory search and advertising service delivery to IP phones 101. Referring to FIG. 12, merchants 1201 engage directly, via a web-based interface, with the content distribution platform owners 1204 to schedule, target, and provide multimedia content for what is referred to herein as the "premium listing services" (described in more detail further below). Among the services supported by the present innovation are "web search engine-like" search capability on the terminal (IP phone 101), user-aware "yellow pages" applications on the terminal (IP phone 101), one-touch call initiation, no-contact transactions, ability to save query results on the terminal (IP phone 101), delivery of multimedia advertisements to IP phones 101, and priority listings of merchant information based on contextual data supplied by merchant 1201.

Referring to FIG. 12, FIG. 12 further illustrates that converged communications content distribution architecture 1200 enables the distribution of merchant directory (contact) information and advertising content to end-user terminals (IP phones 101) supported by a service provider's converged communications infrastructure 1205 (VoIP and/or POTS/Broadband). Content may be provided directly by existing content owners 1202 or by the merchant's themselves via network 102. The architecture identifies five major stakeholders: the merchants 1201 that want to make their services and products available to end-users 1203, established content owners 1202 that possess basic contact information on merchants 1201, converged communication service providers that provide the communications infrastructure used to physically exchange information between merchants 1201 and end-users 1203, and owners 1202 of the content distribution end-to-end channel.

Figure 13:
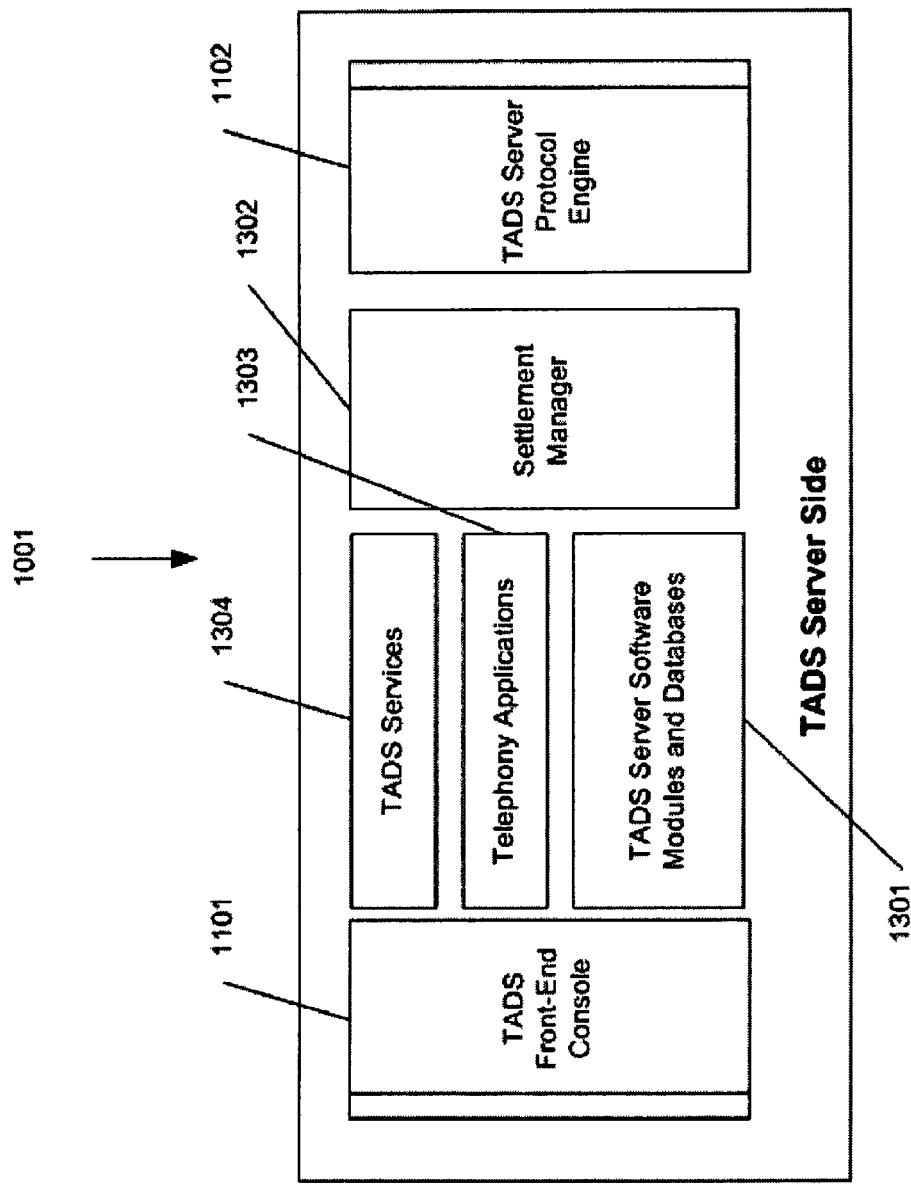
FIG. 13 illustrates an embodiment of the present invention of a transactional application delivery system server side elements.

FIG. 13 illustrates an embodiment of the present invention of TADS server side elements 1001 that further clarify the elements of TADS server side elements 1001 depicted in FIG. 10. Referring to FIG. 13, in conjunction with FIGS. 10 and 11, TADS server side elements 1001 include front-end console 1101 that allows merchants to submit to the content distribution platform, via a web-based interface, multi-media advertising content, define the demographic characteristics of the target audience, schedule the dates and times when the ads should be distributed, and pay for the service. TADS server side elements 1001 further include a TADS server protocol engine 1102 that handles all communications using the TADS protocol on the server side for handling transactions, distributing advertisements, subscribing clients 1002 to distribution groups and delivering products to clients 1002. TADS server side elements 1001 further include various server software modules and databases 1301 on top of which telephony applications 1303 and converged voice-data applications and services 1304 may be constructed. TADS server side elements 1001 may further include a settlement manager 1302 that maintains a log of all end-user actions during a converged communications session that can then be used to determine profit allocation throughout the value chain (merchants, content providers, service providers, and the owner of the content distribution platform) as well as to obtain valuable closed activity reports that may be used to develop new services and log valuable demographic data on all end-user transactions.

Figure 14:
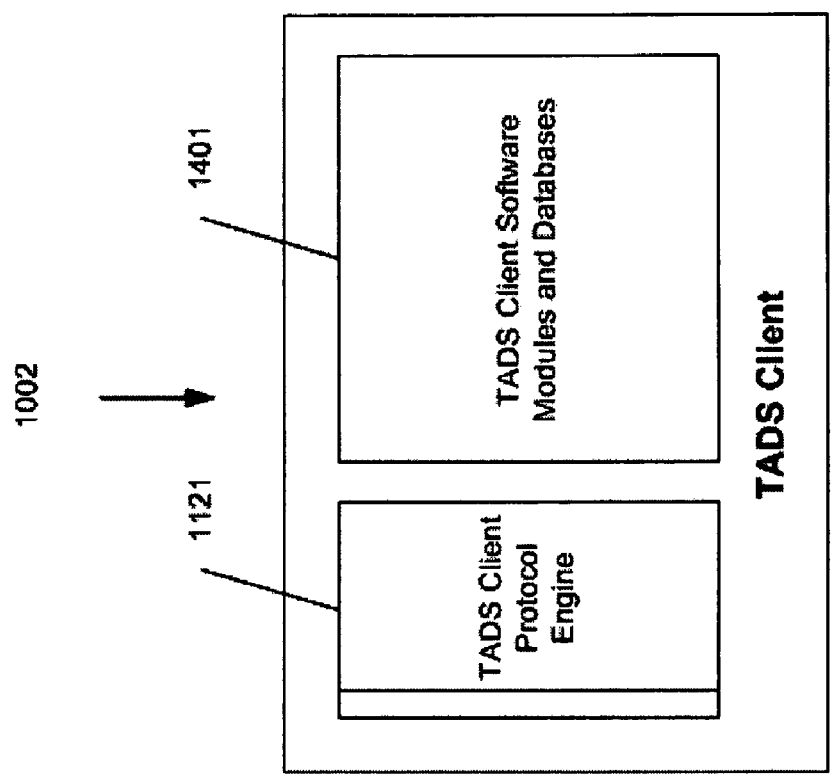
FIG. 14 illustrates an embodiment of the present invention of a transactional application delivery system client side elements.

FIG. 14 illustrates an embodiment of the present invention of TADS client side elements 1002 that further clarify the elements of TADS client side elements 1002 depicted in FIG. 10. Referring to FIG. 14, in conjunction with FIGS. 10-11, TADS client side elements 1002 include TADS client protocol engine 1121 and various client software modules and databases 1401. Client protocol engine 1121 handles all communications using the TADS protocol in each client. The TADS communication protocol is used for handling transactions, distributing advertisements, subscribing client side elements 1002 to distribution groups and delivering products to client side elements 1002.

Figure 15:
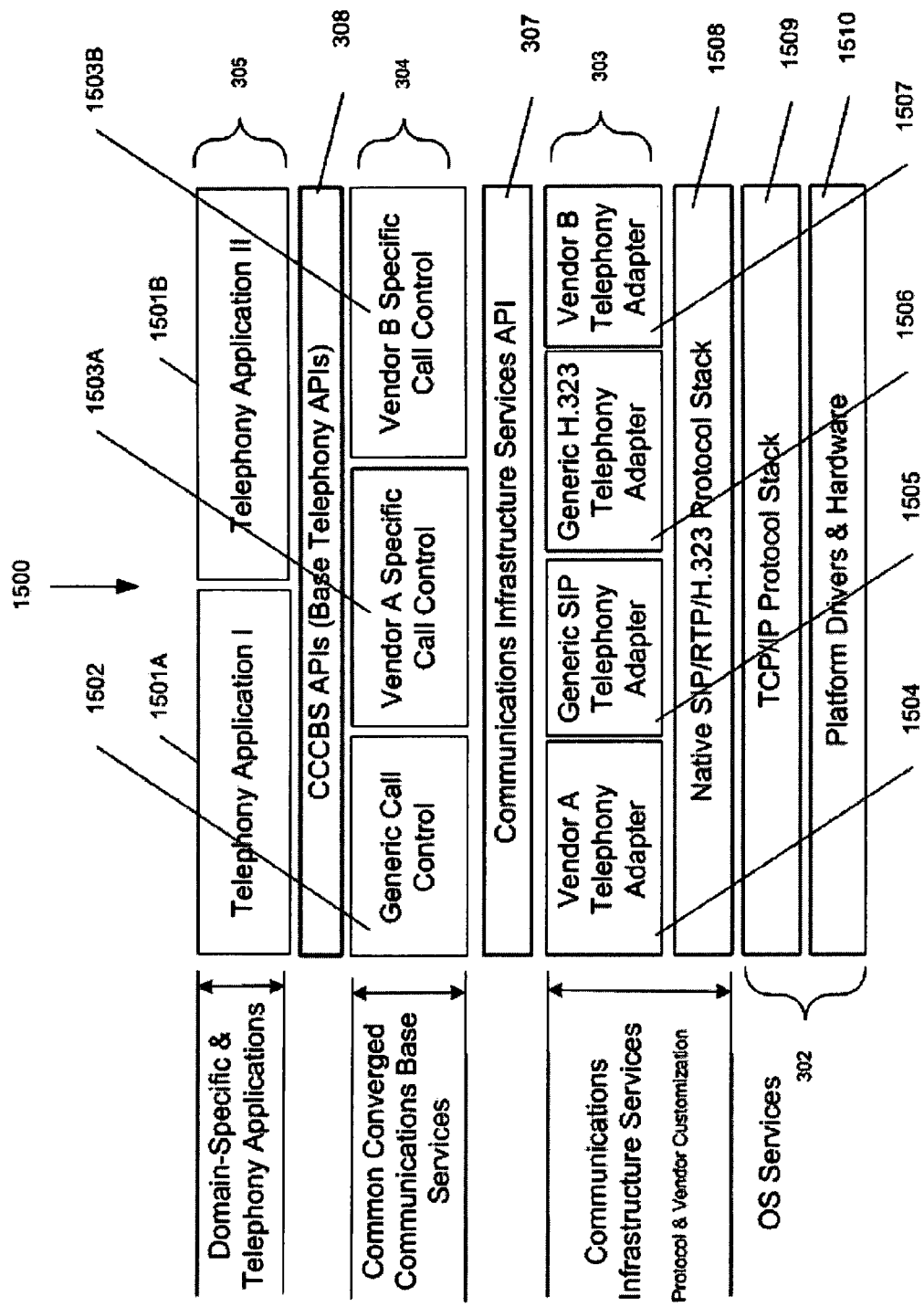
FIG. 15 illustrates an embodiment of the present invention of a telephony services architecture.

FIG. 15 is an embodiment of the present invention of a telephony services architecture using software platform 300 (FIG. 3) in IP phone 101 (FIGS. 1-3 and 27). Referring to FIG. 15, in conjunction with FIGS. 1-3, telephony services architecture 1500 allows for flexible implementation of extended telephony features independent of the back-end infrastructure and signaling protocol. It also hides from the application changes in the underlying operating system and hardware platform. Adding new telephony features entails changes in three main areas: extending the call control model and state machine, implementing the message exchange (call flow) in a particular signaling protocol (e.g., Session Initiation Protocol (SIP) or H323), and decoding proprietary extensions to the signaling protocol (e.g., non-standard SIP headers).

CCCBS API 308 provides a uniform telephony interface to an application, e.g., telephony application I 1501A, telephony application II 1501B, in domain-specific applications layer 305. Applications 1501A, 1501B request telephony services (make a call, receive a call, disconnect a call, hold, transfer, forward, redial, reject, activate speaker phone) and receive confirmation events specifying if the action was completed successfully or some failure occurred. CCCBS API 308 also notifies the application of events originated at the remote end (e.g., call was dropped).

CCCBS layer 304 implements telephony high-level abstractions (call, address, terminal, provider, connections) and the call control state machine. The generic call control block 1502 provides basic features expected from a regular phone such as make call, receive call, hold, transfer, 3-way conference, call waiting, redial, do not disturb, caller id, and predialing. Many other extended features such as forward, find-me, call park/pickup, click-to-dial, automatic redial, and call screening could be required depending on the deployment environment or customer's needs. Even though the main logic of many of these features is implemented at the IP PBX 107 or a specific telephony services server 109, such as a SIP Server, client 1002 still needs to extend its baseline state machine (discussed below) to participate and support these features. Customization at this level may require implementing features that only specific vendors provide and selecting the precise feature combination that a customer needs. This is shown in vendor specific call control blocks 1503A-B.

CIS API 307 provides a protocol and vendor independent interface that will isolate CCCBS layer 304 from changes in the signaling protocol used to implement supported telephony services and how the protocol is used to implement a particular feature. For example, one may use either SIP or H323 as the underlying signaling protocol depending on the telephony infrastructure where IP phone 101 will be deployed. In addition, the same standard feature, call forward for example, can be implemented with a different combination of protocol messages. Since SIP is a general protocol for the establishment and management of multimedia sessions and not specific to telephony (that is, establishing telephony sessions is one of its uses), one may combine SIP messages in different ways to implement the same telephony features. IP phone 101 may need to adapt the implementation of a given feature with a given protocol to comply with the specifications of IP PBX 107 or a specific telephony services server 109, such as a SIP server, of the environment in which IP phone 101 will participate. Sometimes, even with standard messages such as SIP REGISTER, vendors may require specific headers in order to interoperate. The CIS layer 303 may include vendor-specific telephony adapters 1504, 1507, a generic SIP telephony adapter 1505, and a generic H.323 telephony adapter 1506. It is noted that CIS layer 303 may include other adapters and that FIG. 15 is illustrative.

The native SIP/H323 protocol stack 1508, a part of CIS layer 303, provides portable protocol implementation between different operating systems and uses standard TCP/IP and standard network programming APIs to communicate with operating system services layer 302 which includes a TCP/IP protocol stack 1509 and controls platform drivers and hardware 1510.

Figure 16:
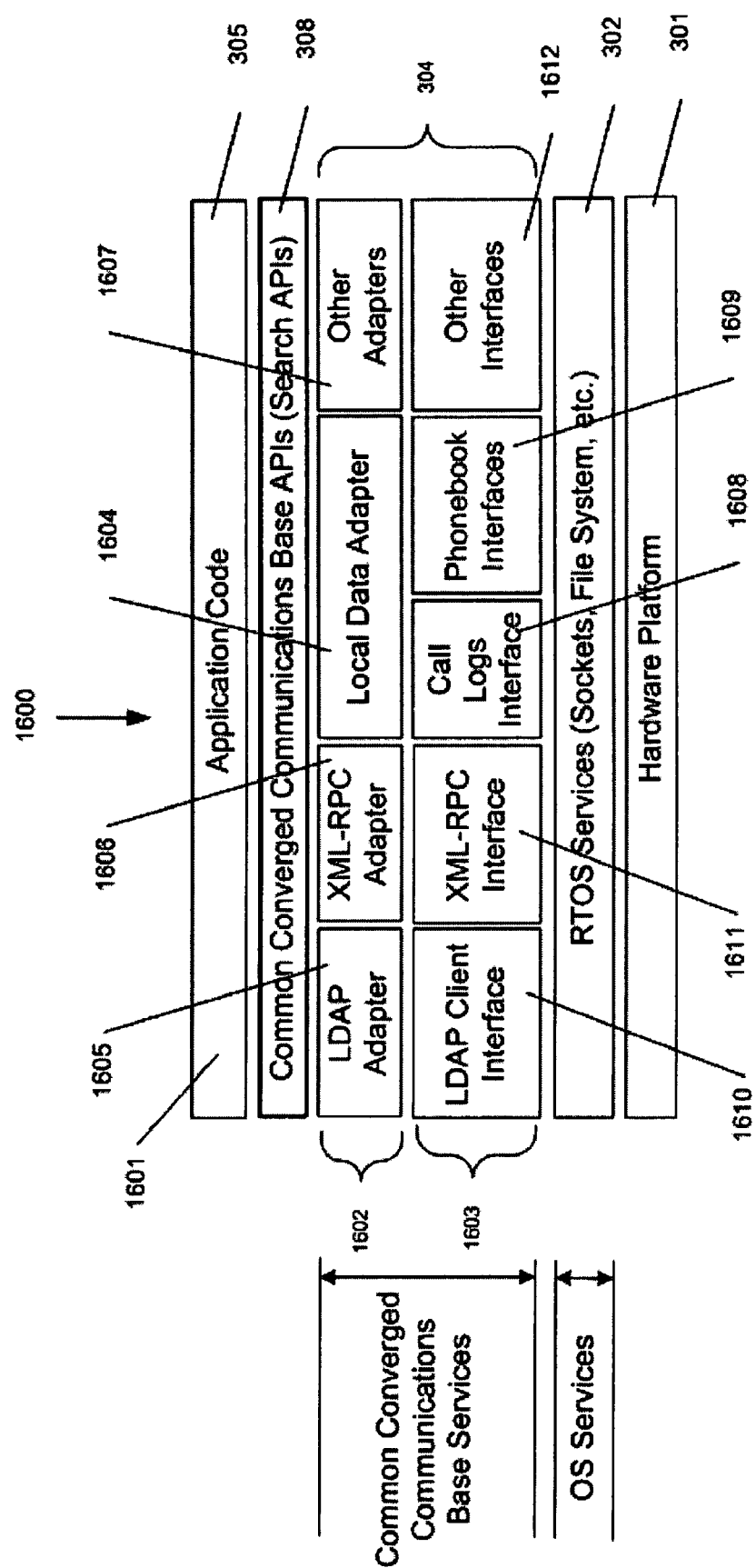
FIG. 16 illustrates an embodiment of the present invention of a directory services architecture.

FIG. 16 illustrates an embodiment of the present invention of a directory services architecture 1600 using software platform 300 (FIG. 3) in IP phone 101 (FIGS. 1-3 and 27). Referring to FIG. 16, in conjunction with FIGS. 1-3, directory services architecture 1600 allows an application operating on IP phone 101 to access information such as contacts and call logs in a consistent manner regardless of where the information is physically stored or managed. Architecture 1600 hides from the application changes in the location of the information, the protocol used to access the information and in the underlying OS and hardware platform.

CCCBS API 308 provides a uniform interface to an application 1601 to access call history information, phone addresses and contact information in general. This information can be stored locally in IP phone 101 or in a remote server.

CCCBS layer 304 is divided in two sub layers 1602, 1603. Sub layer 1603 implements the specific information exchange protocol and the other formats the data appropriately for application 1601 through CCCBS API 308 and transforms the application requests and data appropriately for its final repository.

If the information is stored locally, then a local data adapter 1604 in sub layer 1602 needs to read the file, decode it (XML, binary fixed size records) and present it to application layer 305. If the information is stored remotely, then a protocol is needed to exchange information between IP phone 101 and the remote repository. Sub layer 1602 includes the interfaces to access operating system services layer 302. For example, local data adapter 1604 may access call logs interface 1608 and phonebook interfaces 1609 to make available locally stored information to the application code 305 via the CCBS APIs 308.

LDAP is standard protocol for providing client-server access to directory services. Directory services are commonly used in IP telephony to carry out authentication, personalization and contact searching. A portable LDAP client can be implemented on IP phone 101 or exchange directory information in XML format with an external LDAP client that makes the actual connection to the repository. An LDAP adapter 1605 in sub layer 1602 uses the LDAP client to fulfill application requests and presents the information to the application. LDAP adapter 1605 interfaces with operating system services layer 302 via an LDAP client interface 1610.

An XML-RPC adapter 1606 in sub layer 1602 and interface 1610 in sub layer 1603 allow IP phone 101 to send and receive requests from a remote server in XML format. In particular, SOAP is an XML-RPC language that uses HTTP as a transport protocol and will provide IP phone 101 with the foundation to communicate with servers exposing information through web services.

Other adapters 1607 in sub layer 1602 can be included as necessary to interoperate with other sources of contact information. For example, third party IP PBXs, centrex, call mangers and softswitches can provide personal directories and call logs so that IP phone 101 does not need to use storage space locally but may use proprietary protocol to exchange the information. IP phone 101 may also want to access/synchronize contacts with devices, e.g., Pocket PC, or third party contact management software. Other adapters 1607 interface with operating system services layer 302 via other interfaces 1612.

Another important part of base services layer 304 provided by platform 300 are the Transactional Applications Delivery System (TADS) services discussed above. As stated above, the TADS is a networked system that distributes Transactional Applications (TAs) to remote VoIP agents based on user profiles associated with the agents. A TA is a relatively small hosted application that enables the user of the VoIP agent (a consumer) to complete commercial transactions with one or more vendors. The TADS also gathers TA usage information to build user profiles that enable vendors to target TAs to their customers. TADS services are coordinated through a network server maintained by the TADS service provider.

Referring to FIG. 16, in conjunction with FIGS. 1-3, operating system services layer 302 includes Real Time Operating System (RTOS) services 1613 used to interface with the low-level memory, I/O and control resources of the platform hardware 301 (hardware of IP phone 101).

Figure 17:
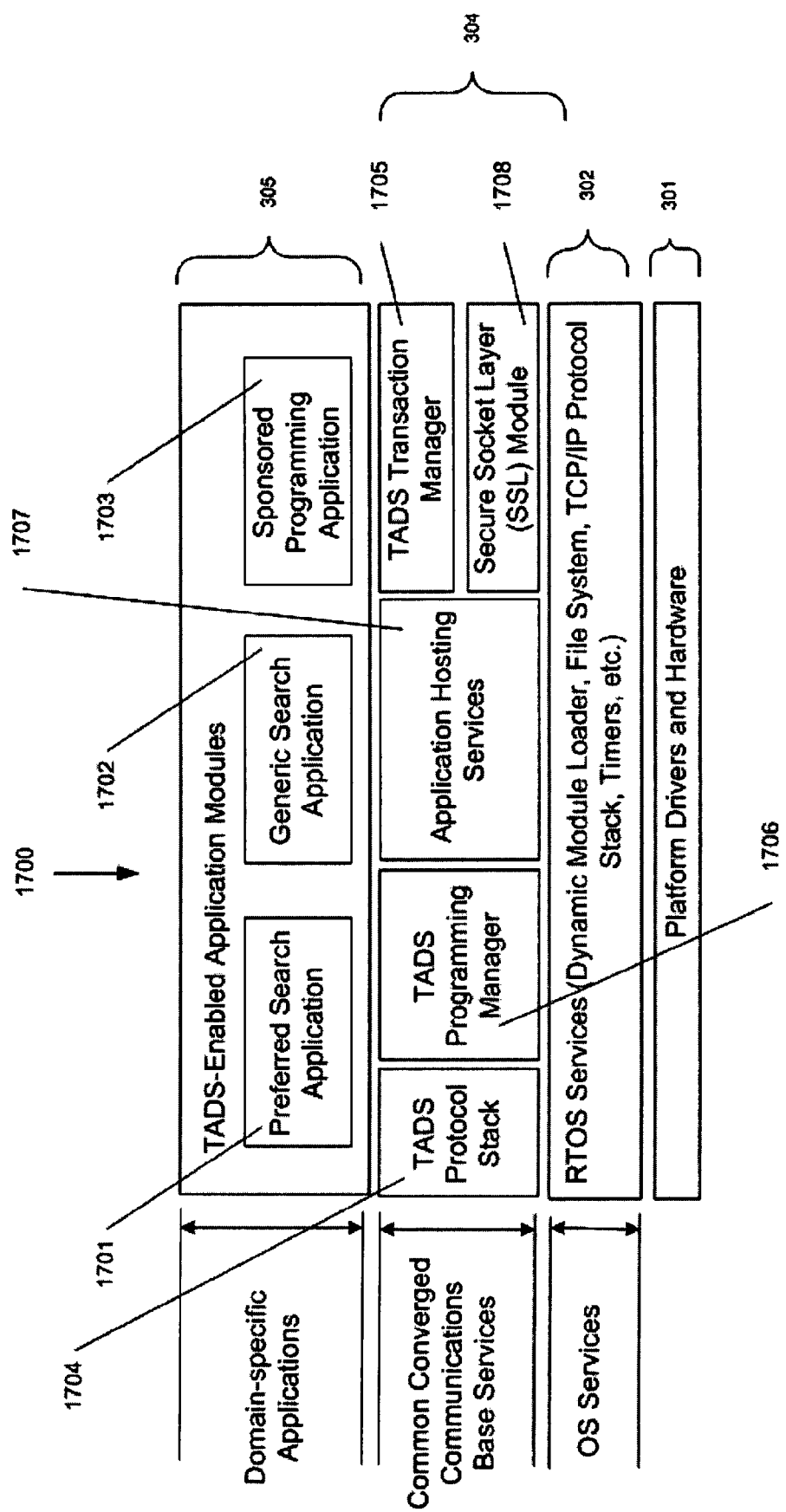
FIG. 17 illustrates an embodiment of the present invention of how transactional applications in a domain-specific applications layer are supported by the software modules in the converged communication base services layer of the software platform of the IP phone.

FIG. 17 illustrates an embodiment of the present invention of a transactional application delivery system services architecture 1700. Referring to FIG. 17, in conjunction with FIGS. 1-3, 10 and 11, FIG. 17 further illustrates an embodiment of the present invention of how TAs in layer 5 (Domain-specific Applications) 305 are supported by software modules in layer 4 (CCCBS) 304 of software platform 300 in IP phone 101. Please find presented three examples of domain-specific hosted applications as examples, namely: preferred search 1701, local search 1702 and sponsored programming 1703. Preferred search 1701 is a series of configurable and extensible shortcuts to information on commercial services and products made available to the user by the TADS service provider. Local search application 1702 allows the consumer to browse through products and services offered by vendors local to a specific geographical region. Sponsored programming application 1703 feature advertisements selected based on usage statistics, consumer demographics and other consumer information. All three types of applications 1701-1703 can generate transactions, voice calls and other events that can be used to augment user profiles A TADS protocol stack 1704 in CCCBS layer 304 implements the communication protocols needed to distribute TAs, carry out transactions, and gather TA events. A TADS transaction manager 1705 in CCCBS layer 304 uses TADS protocol stack 1704 to carry out transactions with another transaction manager at TADS server 1001. A TADS programming manager 1706 in CCCBS layer 304 receives and manages programming information from TADS server 1001 to schedule sponsored programming and other advertisements. Application Hosting Services (AHS) 1707 provide the environment needed by third-party applications in layer 5 305 to run. A Secure Sockets Layer (SSL) module 1708 in CCCBS layer 304 provides secure transport of information between nodes of the network.

TADS client side elements 1002 services can be shared by applications targeted for a broad range of domains, therefore reusing the code that provides the services and effectively shortening the development cycle of domain-specific applications.

Application delivery system services architecture 1700 may further include RTOS services 1709 in operating system services layer 302 which is interfaced with platform drivers and hardware 1710.

Figure 18:
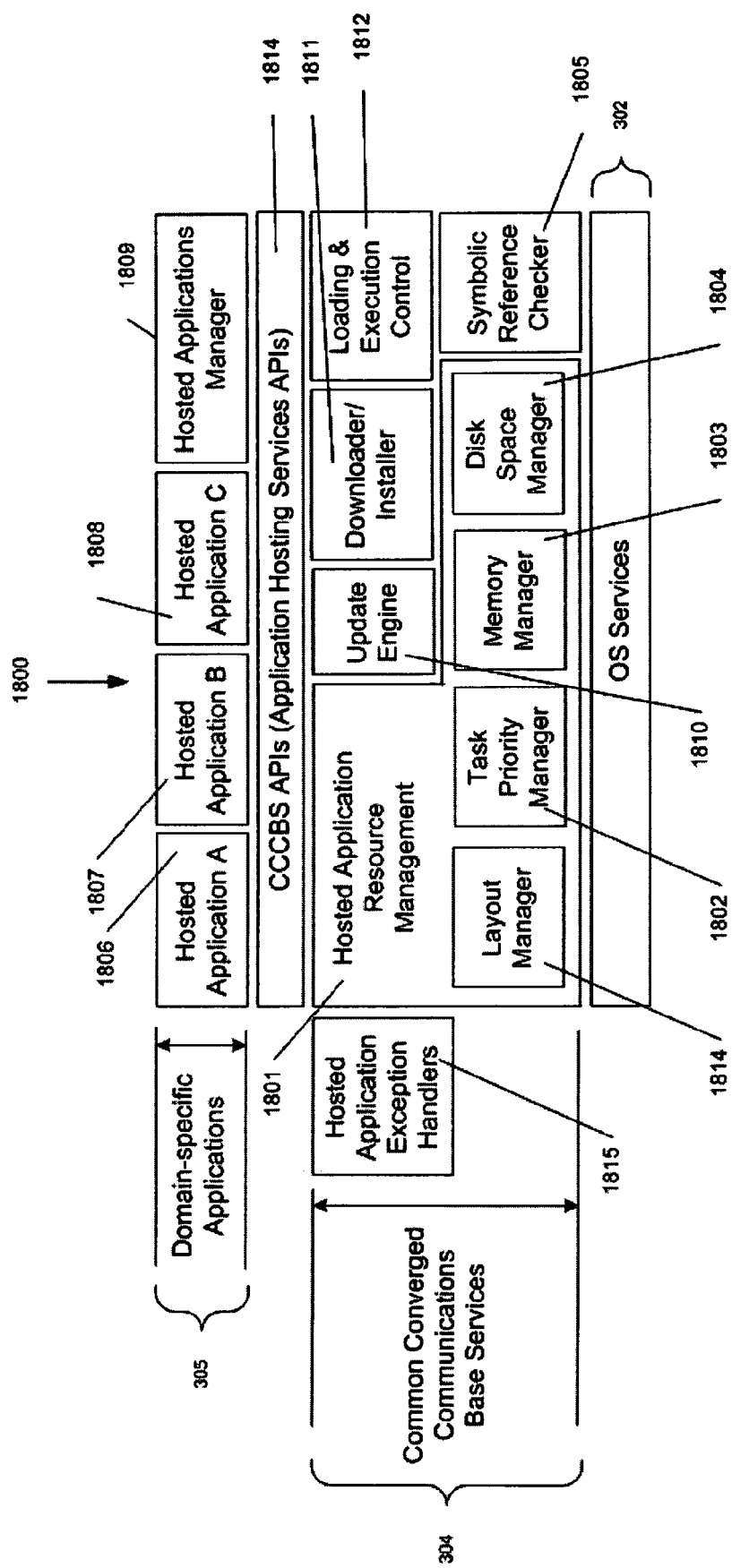
FIG. 18 illustrates an embodiment of the present invention of a transactional application delivery system services architecture.

FIG. 18 illustrates an embodiment of the present invention of an application hosting services ("AHS") architecture 1800 using software platform 300 (FIG. 3) in IP phone 101 (FIGS. 1-3 and 27). AHS architecture 1800 may be used to facilitate the management of third-party applications operating on platform 300 (FIG. 3) of IP phone 101 (FIGS. 1-2 and 27). This includes, but is not limited to: searching for suitable applications on the web, downloading host-able applications to the target, loading and running applications on the target, security and protection mechanisms to protect other code and data on the target from malicious applications, and access methods to input/output resources of the IP phone 101.

Symbolic reference checker 1805 provides security against malicious programs by making sure only the appropriate symbols are referenced from the hosted applications. This utility is used before the application is loaded into the target's memory. Another security mechanism is to have the applications run in a special mode where only some of the services offered by platform 300 are accessible. Hosted application exception handlers 1815 can protect the stability of the load by filtering exceptions based on the task that generates them, only penalizing the offending hosted application and not the whole load. Referring to FIG. 18, disk and memory quotas and other resource usage policies may be enforced by the hosted application resource management modules 1801, layout manager 1813, task priority manager 1802, memory manager 1803 and disk space manager 1804.

Update engine 1810 provides application search services that allow the IP Phone 101 to find an appropriate hosted application, or an update to an already hosted application, on another computer system through the use of a network 2704 (FIG. 27). Downloader/installer 1811 provides the services required to transfer hospitality applications from other computer systems to the persistent storage (FLASH) 2712 or disk init 2708 of the IP Phone 101. Loading & execution control 1812 implements the services required to load hosted application to RAM memory 2714 and to execute or halt such applications.

Hosted application A 1806, hosted application B 1807 and hosted application C 1808 are example hosted applications. There could be several hosted applications running at the same time on the IP phone 101 or waiting to be run. A hosted applications manager 1809 is an example hosted application used to organize and control other hosted applications 1806, 1807, 1808. Application Hosting Services (AHS) application programming interfaces (APIs) 1814 provide all the resources and services the hosted applications 1806, 1807, 1808 and 1809 use. Applications targeted for a broad range of domains can share these APIs, therefore reusing the code beneath and effectively making the development cycle shorter.

Figure 19:
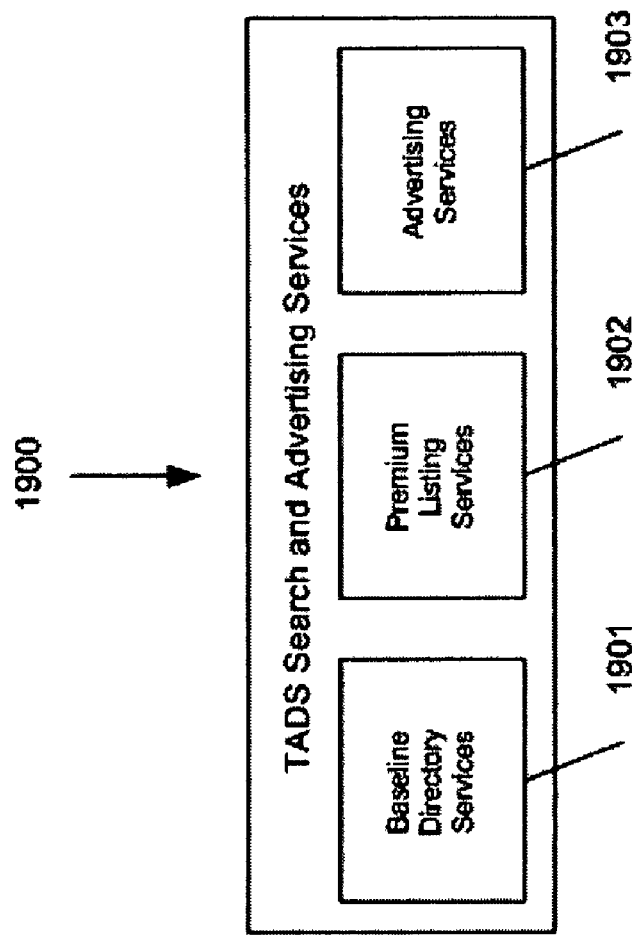
FIG. 19 illustrates an embodiment of the present invention of a transactional application delivery system (TADS) directory search and advertising services.

FIG. 19 illustrates an embodiment of the present invention of directory search and advertising services 1900. Referring to FIG. 19, directory search and advertising services 1900 constitute an example class of TADS-enabled applications and services that can be built on top of the TADS server side and client side software modules and databases. The services may be categorized according to baseline directory services 1901, premium listing services 1902, and advertising services 1903. A description of the services that can be offered under each category and how these are supported by converged communications content distribution platform owner 1204 (FIG. 12) are described below.

Figure 20:
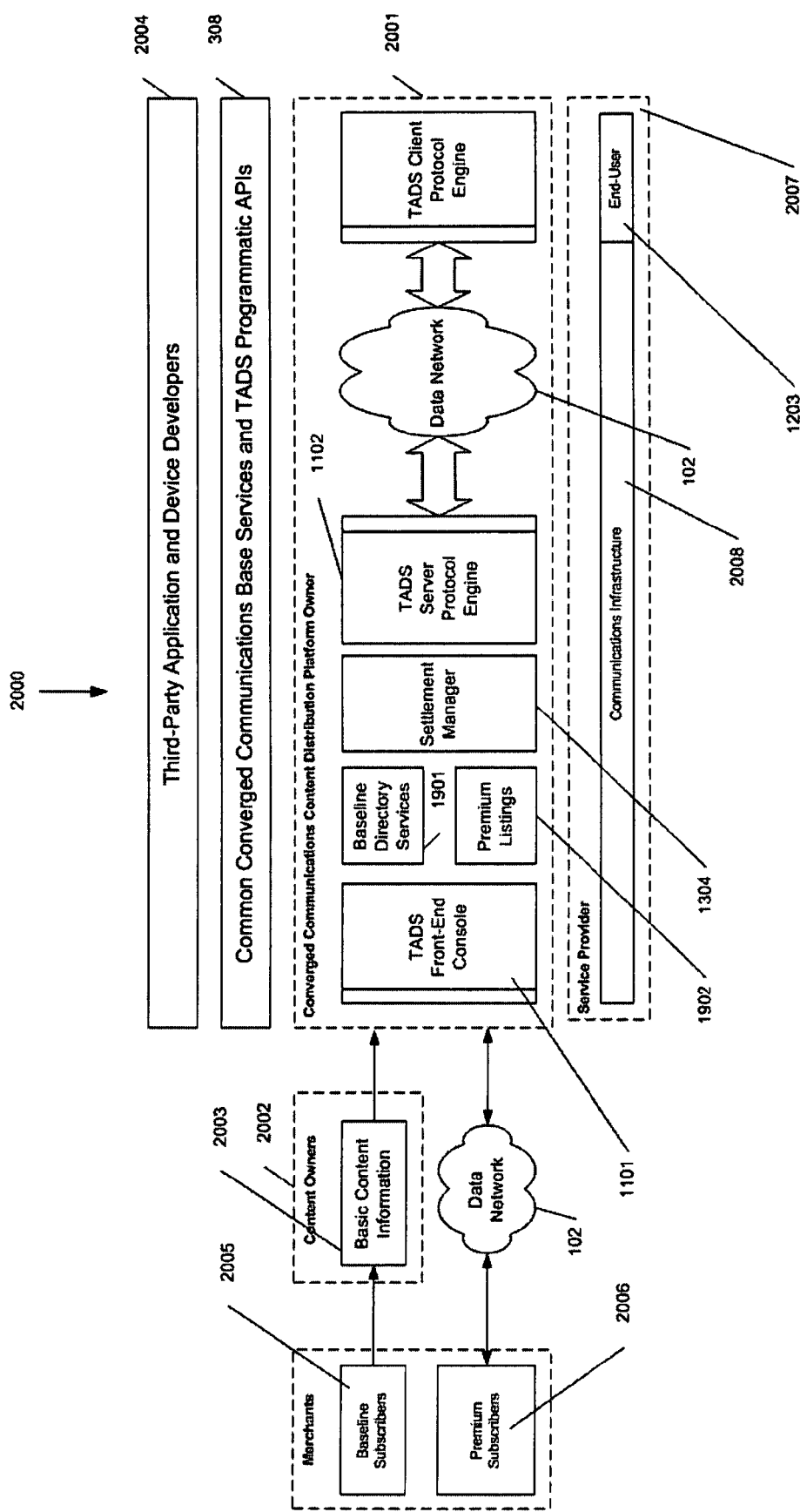
FIG. 20 illustrates an embodiment of the present invention of monetizing baseline directory services, premium listing services and advertising services.

FIG. 20 illustrates monetizing baseline directory services 1901 (FIG. 19), premium listing services 1902 (FIG. 19) and advertising services 1903 (FIG. 19) in accordance with an embodiment of the present invention.

Referring to FIGS. 19 and 20, in conjunction with FIGS. 1-3, 11, 12 and 13, baseline directory services 1901 are constructed from existing baseline subscriber merchant 2005 directory (contact information) content databases 2003 provided by content owners 2002. Baseline directory services 1901 include all end-point views of said information displayed on the end-user terminals (IP phone 101) and the end-user actions that can be performed on the information. These services include, but are not limited to, directory queries, query results local save, and one-touch communications.

Directory query involves the end-user invoking the local search application on the converged communications terminal (IP phone 101) and entering the required search information (e.g., merchant category and desired location). The end-user query is handled by the client protocol engine 1121 and securely submitted to TADS server protocol engine 1102. Server returns query results to the end-user terminal 101, providing baseline information (including information such as merchant name, address, phone numbers, and maps) and premium listing services (see below) for all merchants that match the query specifications. Settlement manager 1302 logs all actions associated with the served transaction including, for example, the merchants actually viewed by the end-user, the merchants for which the end-user requested more information, the merchants that were actually contacted by the end-user, and the merchants for which the end-user responded to premium listing actions. Note that this close-looped environment allows the content distribution platform owner to use contextual information beyond the query search terms provided by the end-user, such as the location of the IP Phone (residence, hotel, condominium), past end-user usage patterns (preferences), and demographics to provide higher quality search results.

Query results local save involves the end-user selecting one of baseline or premium listings 1901, 1902, respectively, returned by a directory query and save the associated content information into a local entry in their converged communications terminal (IP phone 101) address book. Settlement Manager 1302 logs the transaction.

One-touch communications involves the end-user selecting one of baseline 1901 or premiums 1902 listings returned by a directory query and initiates a call via the converged communications infrastructure by simply selecting the "one-touch" call feature. Settlement manager 1302 logs the transaction.

Premium listing services 1902 are constructed from existing merchant directory (contact information) content databases provided by the content owners and additional information provided directly by the merchants via the web-based TADS front-end console 1101 that feeds into the converged communications content distribution platform owner 1204. Premium listing services 1902 include, but are not limited to, top billing (priority placement) of a merchant's contact information in results provided in response to an end-user query (including multimedia content) and no-contact transactions (allows end-user to complete a transaction with the merchant without the need to generate a voice call).

Top billing (priority placement) service involves merchants using TADS front-end console 1101 to subscribe to this premium listing service. Merchants provide the converged communications content distribution platform 1204 (FIG. 12) with contextual information required for the platform to provide merchant priority placement in the presentation of query results to end-users. The contextual information takes the form of both keyword information associated with the merchant's services and end-user demographic information that the merchant may want included in the determination of whether or not top-billing should be provided to its listing. Settlement manager 1302 logs all aspects of the transaction.

Multimedia listing services involves merchants using TADS front-end console 1101 to subscribe to this premium listing service. Merchants provide the converged communications content distribution platform 1204 with contextual information required for the platform to provide merchant priority placement in the presentation of query results to end-users as for the top billing service and provide additional multimedia material to be used in accordance to the type of multimedia listing selected by the merchant. For example, the merchant may opt for half-screen or quarter-screen images to be used in presenting its listing and for specific multimedia presentations to be presented to the end-user if the merchant's listing is selected by the end-user. Settlement manager 1302 logs all aspects of the transaction.

No contact call services involve merchants using TADS front-end console 1101 to enable no contact call service functionality for its premium listings. If an end-user selects a listing with no-contact call service functionality, the TADS server 1001 manages the request by prompting the end-user to provide, via the converged communication terminals (IP phone 101) input interface, to provide all required information to complete a transaction according to the vendor requirements. Information is then transferred to the merchant without further end-user intervention (e.g., via e-mail or synthesized voice message). Upon receipt of the request the merchant takes the appropriate action. For example, a premium pizzeria's listing could prompt the user to select amongst a variety of offers. The user would provide the required information pertaining to the offers (for example, pizza size, toppings, crust, etc.) and the converged communications content distribution platform owner 1204 would relay the information to the merchant. There would be no need for the end-user to provide address, phone number, and payment information since all of this information would already be available to the converged communications content distribution platform owner 1204 through its relationship with the converged communications infrastructure service provider 2007 and content distribution platform owner 1204. Settlement manager 1302 logs all aspects of the transaction.

Advertising services 1903 are constructed from existing merchant directory (contact information) content databases 2003 provided by the content owners 2002 and additional information provided directly by the premium subscriber merchants 2006 via the web-based TADS front-end console 1101 that feeds into the converged communications content distribution platform owner 1204. Merchants 1201 may define distribution and level of exposure for an advertisement using criteria such as user demographics, geographical or organizational boundaries and buying history. Advertising services include, but are not limited to, the distribution of wall-paper (digital image rendered on the converged communications terminal's display) and video advertisements that can be displayed on the end-user terminal (IP phone 101) based on specific criteria, including demographics-based algorithms. In all cases the advertisements would retain a portion of end-user's 1203 terminal display. End-user 1203 would have the option of receiving more information on the advertising service or product by simply selecting it via the terminal's input interface. These advertisements would be scheduled and targeted according to the merchant's instructions. Settlement manager 1302 logs all aspects of the transaction.

Figure 21:
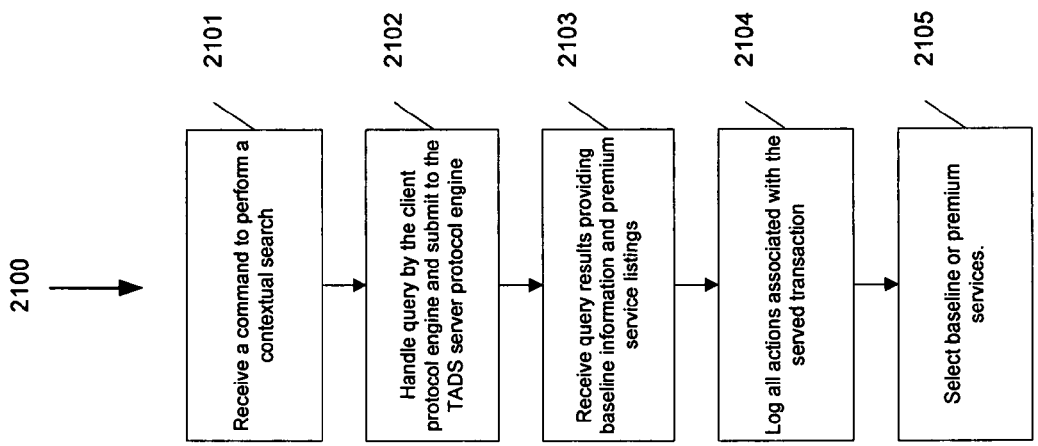
FIG. 21 is a flowchart of a method for performing contextual search in accordance with an embodiment of the present invention.

FIG. 21 is a flowchart of a method 2100 for performing contextual searches, as discussed above, in accordance with an embodiment of the present invention. Referring to FIG. 21, in conjunction with FIGS. 1-3, 11, 13, 17 and 19, in step 2101, IP phone 101 receives a command to perform a contextual search as well as the search query from the end-user. IP phone 101 receives such a command in response to the end-user invoking local search application 1702 on the converged communications terminal (IP phone 101) and entering the required search information (e.g., merchant category and desired location). In step 2102, the end-user query is handled by client protocol engine 1121 and securely submitted to TADS application server 108. It is implied that a remote application server 108 will receive the criteria for the contextual search, produce results based on them and send the results back to the IP phone 101 using a TADS server protocol engine 1102. In step 2103, IP phone 101 receives the query results from application server 108 where the query results provide baseline directory services 1901 (including information such as merchant name, address, phone numbers, and maps) and premium listing services 1902 for all merchants that match the query specifications. In step 2104, settlement manager 1304 logs all actions associated with the served transaction including, for example, the merchants actually viewed by the end-user, the merchants for which the end-user requested more information, the merchants that were actually contacted by the end-user, and the merchants for which the end-user responded to premium listing actions. In step 2105, the end-user selects either baseline or premium services 1901, 1902, respectively, for the merchant of interest and proceeds according to the nature of the listing.

It is noted that method 2100 may include other and/or additional steps that, for clarity, are not depicted. It is further noted that method 2100 may be executed in a different order than presented and that the order presented in the discussion of FIG. 21 is illustrative. It is further noted that certain steps in method 2100 may be executed in a substantially simultaneous manner.

Figure 22:
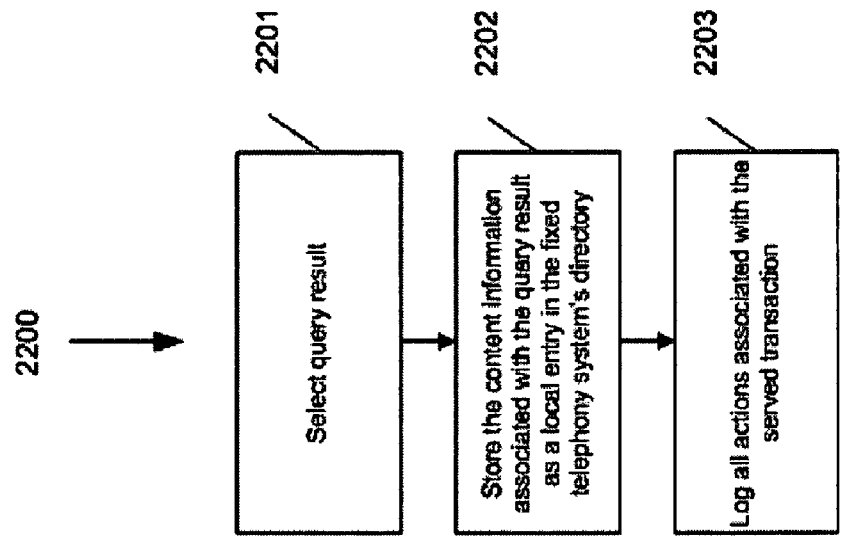
FIG. 22 is a flowchart of a method for performing a local save in accordance with an embodiment of the present invention.

FIG. 22 is a flowchart of a method 2200 for performing a local save, as discussed above, in accordance with an embodiment of the present invention. Referring to FIG. 22, in conjunction with FIGS. 1-3, 11, 13 and 16, in step 2201, the end-user selects a query result. In step 2202, the content information associated with the query result is stored as a local entry in IP phone's 101 phonebook interface 1609. In step 2203, settlement manager 1302 logs all actions associated with the served transaction. For example, the end-user searches for a service establishment by providing information such as the type of service establishment and the location and submitting the query to phonebook interface 1609. The server processes the query and returns various options to the end-user. For each option, the merchant's name and relevant contact information is provided, as is the option to save the merchant's information into the end-users' IP phone local directory. The end-user, by selecting the local save option for a merchant of interest, will save the merchant's contact information into the IP phone's local (on-phone) phonebook interface 1609.

It is noted that method 2200 may include other and/or additional steps that, for clarity, are not depicted. It is further noted that method 2200 may be executed in a different order than presented and that the order presented in the discussion of FIG. 22 is illustrative. It is further noted that certain steps in method 2200 may be executed in a substantially simultaneous manner.

Figure 23:
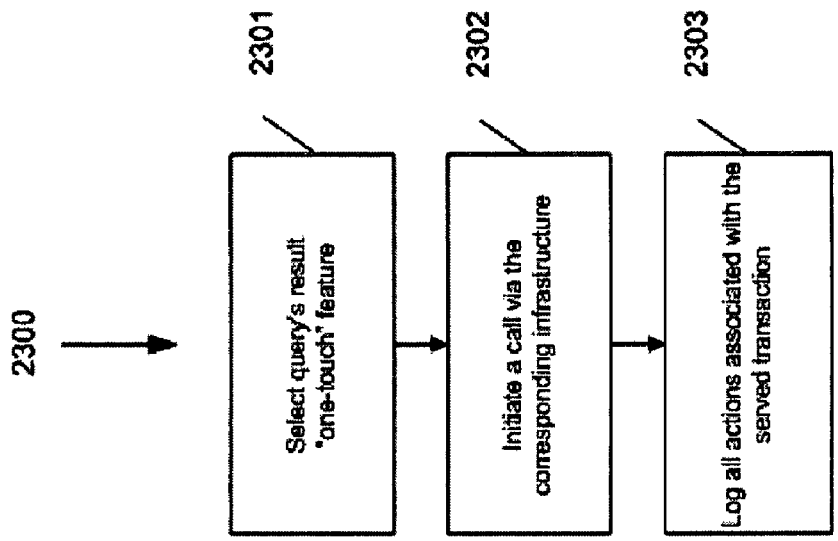
FIG. 23 is a flowchart of a method for performing one-touch call in accordance with an embodiment of the present invention.

FIG. 23 is a flowchart of a method 2300 for performing one-touch calls, as discussed above, in accordance with an embodiment of the present invention. Referring to FIG. 23, in conjunction with FIGS. 1-3, 11 and 13, in step 2301, the end-user selects the query's result "one-touch" feature (example of a feature that can be part of premium listing services 1902). In step 2302, IP phone 101 initiates a call via the corresponding infrastructure, e.g., wireless network 114, voice network 103, data network 102. In step 2303, settlement manager 13024 logs all actions associated with the served transaction.

It is noted that method 2300 may include other and/or additional steps that, for clarity, are not depicted. It is further noted that method 2300 may be executed in a different order than presented and that the order presented in the discussion of FIG. 23 is illustrative. It is further noted that certain steps in method 2300 may be executed in a substantially simultaneous manner.

Figure 24:
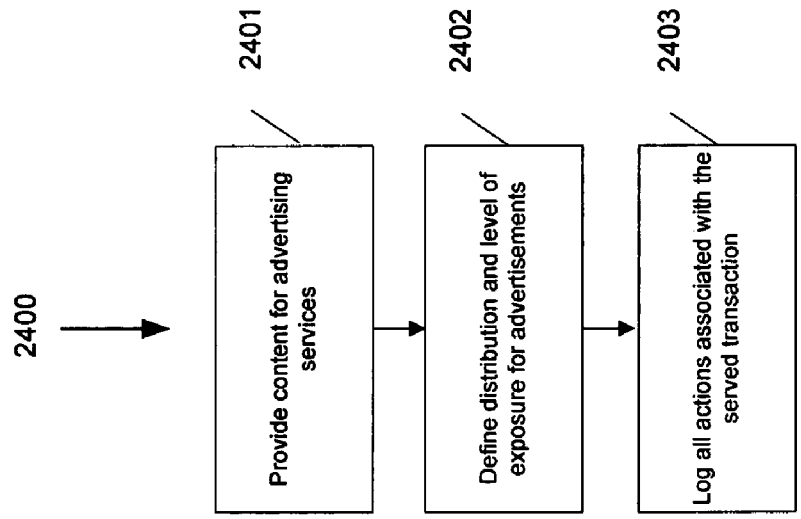
FIG. 24 is a flowchart of a method for scheduling advertisements in accordance with an embodiment of the present invention.

FIG. 24 is a flowchart of a method 2400 for scheduling advertisements, as discussed above, in accordance with an embodiment of the present invention. Referring to FIG. 24, in conjunction with FIGS. 1-3, 11, 13 and 19, in step 2401, merchants use front-end console 1101 to provide content for advertising services. For example, merchants may use TADS front-end console 1101 to subscribe to premium listing services 1902. In step 2402, merchants define distribution and level of exposure for advertisements. For example, merchants provide TADS with contextual information required for the platform to provide merchant priority placement in the presentation of query results to end-users. The contextual information takes the form of both keyword information associated with the merchant's services and end-user demographic information that the merchant may want included in the determination of whether or not top-billing should be provided to its listing. Further, merchants provide TADS with contextual information required for platform 300 to provide merchant priority placement in the presentation of query results to end-users as for premium listing services 1902 and provide additional multimedia material to be used in accordance to the type of multimedia material to be used in accordance to the type of multimedia listing selected by the merchant. For example, the merchant may opt for half-screen or quarter-screen images to be used in presenting its listing and for specific multimedia presentations to be presented to the end-user if the merchant's listing is selected by the end-user. In step 2403, settlement manager 1302 logs all actions associated with the served transaction.

It is noted that method 2400 may include other and/or additional steps that, for clarity, are not depicted. It is further noted that method 2400 may be executed in a different order presented and that the order presented in the discussion of FIG. 24 is illustrative. It is further noted that certain steps in method 2400 may be executed in a substantially simultaneous manner.

Figure 25:
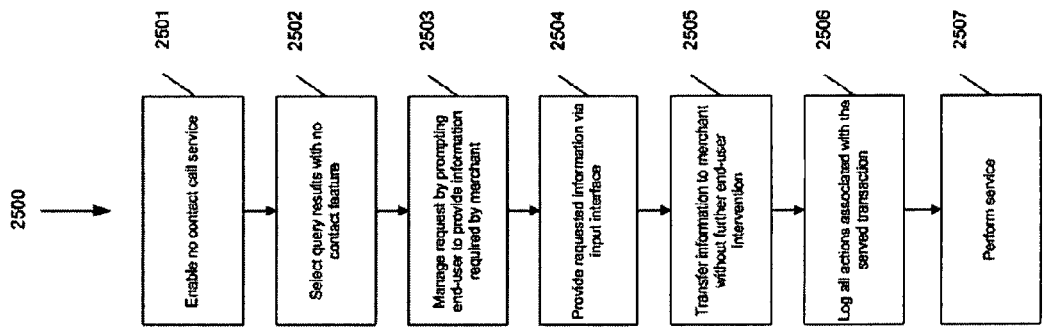
FIG. 25 is a flowchart of a method for enabling no contact call service functionality of select premium listings in accordance with an embodiment of the present invention.

FIG. 25 is a flowchart of a method 2500 to enable no contact call service functionality for its premium listings, as discussed above, in accordance with an embodiment of the present invention. Referring to FIG. 25, in conjunction with FIGS. 1-3, 11, 13, 19 and 20, in step 2501, merchants use front-end console 1101 to enable the no contact call service. In step 2502, the end-user selects a query result with the no contact call service functionality. In step 2503, TADS server 1001 manages the request by prompting the end-user to provide, via the converged communication terminal's input interface (interface to IP phone 101), to provide all required information to complete a transaction according to the vendor's requirements. In step 2504, the information is then transferred to the merchant without further end-user intervention, e.g., e-mail or synthesized voice message. In step 2505, upon receipt of the request, the merchant takes the appropriate action. For example, a premium pizzeria's listing could prompt the user to select amongst a variety of offers. The user would provide the required information pertaining to the offers, e.g., pizza size, toppings, crust, and converged communications content distribution platform owner 2001 would relay the information to the merchant. There would be no need for the end-user to provide an address, a phone number and payment information since all of this information would already be available to converged communications content distribution platform owner 2001 through its relationship with the converged communications infrastructure service provider customer database that is part of the service provider's communication infrastructure 2007. In step 2506, settlement manager 1302 logs all actions associated with the served transaction. In step 2507, merchant performs the service.

It is noted that method 2500 may include other and/or additional steps that, for clarity, are not depicted. It is further noted that method 2500 may be executed in a different order than presented and that the order presented in the discussion of FIG. 25 is illustrative. It is further noted that certain steps in method 2500 may be executed in a substantially simultaneous manner.

Figure 26:
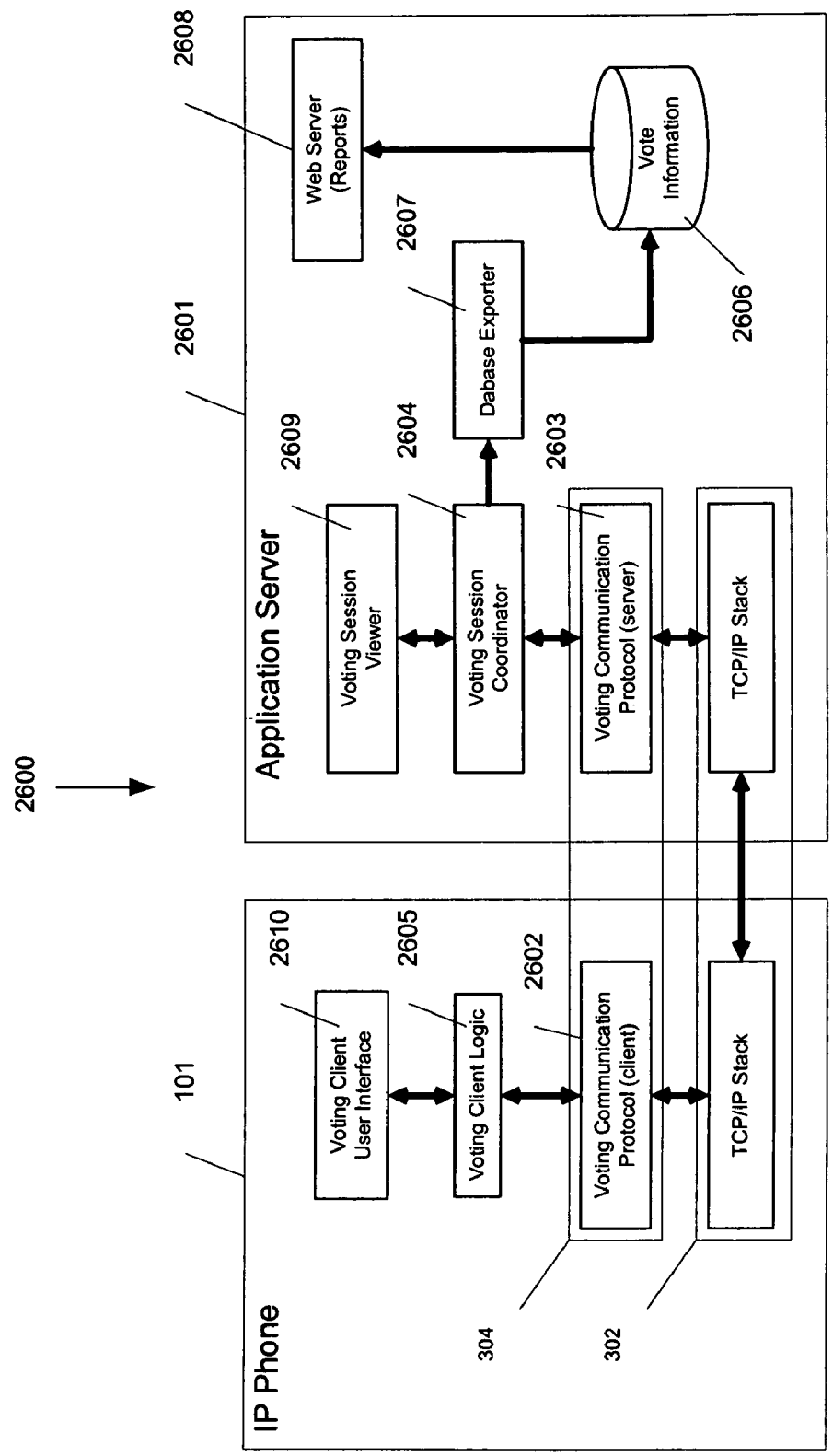
FIG. 26 illustrates an embodiment of the present invention of the interaction between an IP phone and a voting application server used in implementing a voting booth application.
Figure 27:
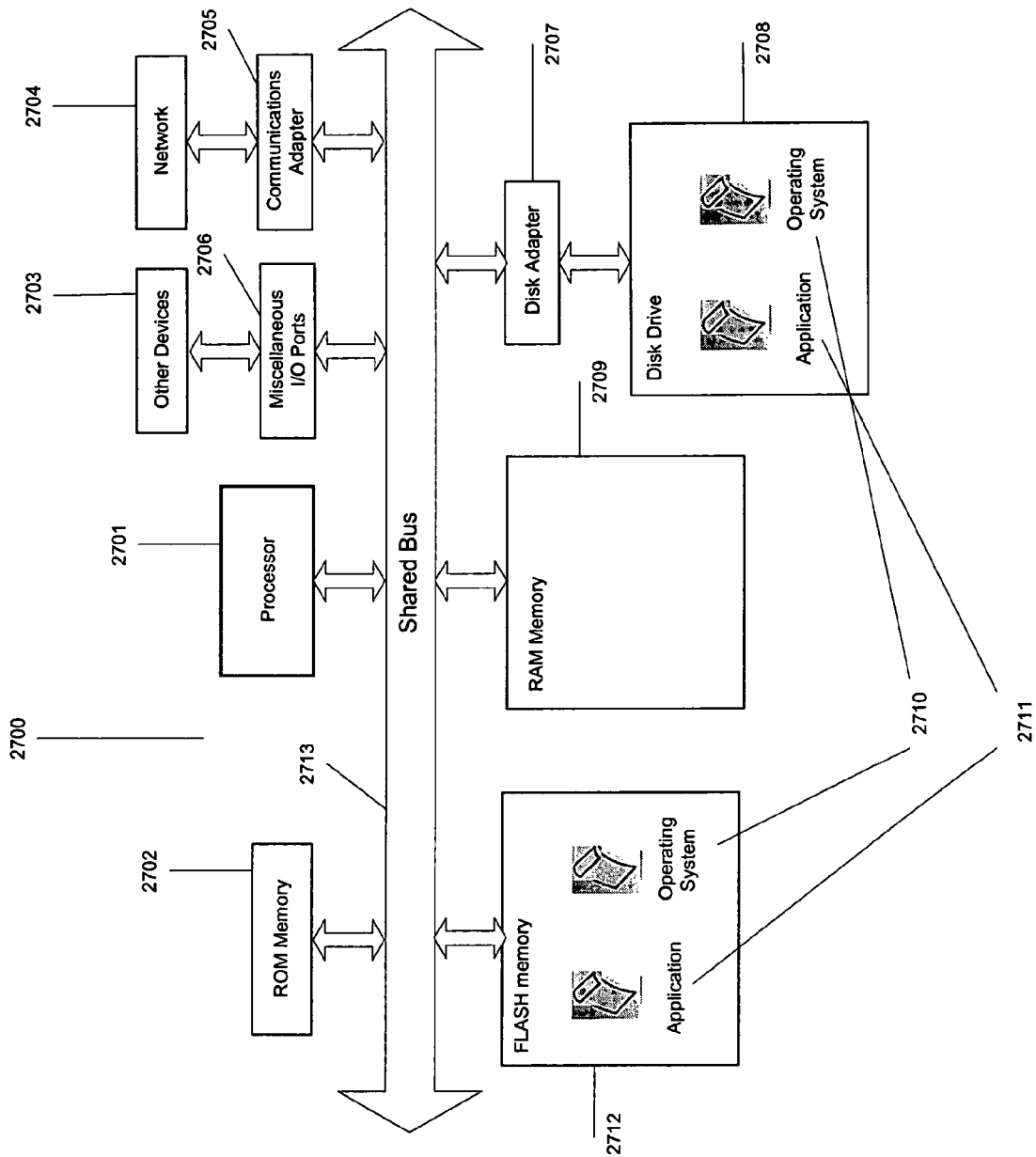
FIG. 27 is an embodiment of the present invention of a hardware configuration of an IP phone.

FIG. 26 is an embodiment of the present invention, illustrative of a domain-specific application for the enterprise environment, of the interaction between IP phone 101 and a voting application server 2601 used in implementing a voting booth application. Referring to FIG. 26, in conjunction with FIGS. 1-3, a voting booth application makes it possible to hold voting sessions on an arbitrary number of issues with an arbitrary number of voters. A client application hosted by platform 300 consults with a central server to get the information to be voted on and presents it to the user via a voting client user interface 2610. The user can choose yes, no, or abstain on each issue included in the voting session. When the user has finished making selections, the votes are sent to server 2601, which in turn saves all of them into a database 2606. Several reports can be made with the data using the normal DBMS methods.

FIG. 26 illustrates client and server parts of the application and the data path between its cooperating modules. Client and server entities 101, 2601, respectively, communicate with each other using their voting communication protocol modules 2602, 2603, respectively. Voting session coordinator module 2604 controls voting sessions with all clients through their voting control logic module 2605 and aggregates vote information into database 2606 using a database exporter module 2607. A web server 2608 then builds reports from the database on demand. A voting session viewing module 2609 lets an administrator supervise the voting process.

Although the method, computer program product and system are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

What is claimed is:

1. A system, comprising:
an Internet Protocol (IP) phone coupled to a server,
wherein said IP phone is configured to receive contextual information from said server, wherein said IP phone comprises:
a memory unit operable for storing a computer program for performing contextual searches;
a processor coupled to said memory unit, wherein said processor, responsive to said computer program, comprises:
circuitry for receiving a command to perform a contextual search;
circuitry for receiving search criteria;
circuitry for submitting said search criteria to said server; and
circuitry for receiving from said server a list of merchants matching said search criteria and information regarding each of said merchants in said list;
wherein a user of said IP phone completes a transaction with at least one of said merchants listed without the need to generate a voice call;
wherein said information received by said user of said IP phone comprises a variety of offers, wherein said user selects one of said variety of offers associated with said one of said merchants listed, wherein said selected offer is transmitted to said one of said merchants listed electronically; and
wherein said user's contact and payment information is not transmitted to said one of said merchants listed, wherein said user's contact and payment information is available to said one of said merchants listed.

2. The system as recited in claim 1, wherein said server is configured to log actions of a user associated with viewing said list of merchants and contacting said merchants in said list.

3. The system as recited in claim 1, wherein said search criteria comprises a location and a type of service establishment.

4. The system as recited in claim 1, wherein said information regarding each of said merchants in said list comprises a name and contact information.

5. The system as recited in claim 4, wherein said processor further comprises:
circuitry for storing said information on one of said merchants in said list selected by a user of said IP phone in a directory in said IP phone.

6. The system as recited in claim 4, wherein said contact information comprises a telephone number, wherein said processor further comprises:
circuitry for receiving a selection of said telephone number associated with one of said merchants in said list selected by a user of said IP phone; and
circuitry for initiating a telephone call to said selected merchant via one of a wireless network, a voice network, a public switched telephone network and a data network.

7. The system as recited in claim 1, wherein said merchants in said list of merchants select one of a plurality of advertising services, wherein each of said plurality of advertising services provides a different level of advertising exposure.

8. The system as recited in claim 7, wherein said different levels of advertising exposure comprise a different amount of contextual information presented to a user of said IP phone.

9. A method for performing contextual searches on an Internet Phone (IP) phone comprising the steps of:
receiving a command to perform a contextual search;
receiving search criteria from a user of said IP phone;
submitting said search criteria to a server coupled to said IP phone; and
receiving from said server a list of merchants matching said search criteria and information regarding each of said merchants in said list;
wherein said information received by said user comprises a variety of offers, wherein said user selects one of said variety of offers associated with said one of said merchants listed, wherein said selected offer is transmitted to said one of said merchants listed electronically; and
wherein said user's contact and payment information is not transmitted to said one of said merchants listed, wherein said user's contact and payment information is available to said one of said merchants listed.

10. The method as recited in claim 9 further comprising the step of:
logging actions of said user associated with viewing said list of merchants and contacting said merchants in said list.

11. The method as recited in claim 9, wherein said search criteria comprises a location and a type of service establishment.

12. The method as recited in claim 9, wherein said information regarding each of said merchants in said list comprises a name and contact information.

13. The method as recited in claim 12 further comprising the step of:
storing said information on one of said merchants in said list selected by said user in a directory in said IP phone.

14. The method as recited in claim 12, wherein said contact information comprises a telephone number, wherein the method further comprises the steps of:
receiving a selection of said telephone number associated with one of said merchants in said list selected by said user; and
initiating a telephone call to said selected merchant via one of a wireless network, a voice network, a public switched telephone network and a data network.

15. The method as recited in claim 9, wherein said merchants in said list of merchants select one of a plurality of advertising services, wherein each of said plurality of advertising services provides a different level of advertising exposure.

16. The method as recited in claim 15, wherein said different levels of advertising exposure comprise a different amount of contextual information presented to said user.

17. A tangible computer readable medium encoded with computer program for performing contextual searches on an Internet Phone (IP) phone comprising the steps of:
receiving a command to perform a contextual search;
receiving search criteria from a user of said IP phone;
submitting said search criteria to a server coupled to said IP phone; and receiving from said server a list of merchants matching said search criteria and information regarding each of said merchants in said list;

wherein said user completes a transaction with at least one of said merchants listed without the need to generate a voice call;

wherein said information received by said user comprises a variety of offers, wherein said user selects one of said variety of offers associated with said one of said merchants listed, wherein said selected offer is transmitted to said one of said merchants listed electronically; and wherein said user's contact and payment information is not transmitted to said one of said merchants listed, wherein said user's contact and payment information is available to said one of said merchants listed.

18. A tangible computer readable medium encoded with computer program as recited in claim 17, wherein said server is configured to log actions of a user associated with viewing said list of merchants and contacting said merchants in said list.

19. A tangible computer readable medium encoded with computer program as recited in claim 17, wherein said search criteria comprises a location and a type of service establishment.

20. A tangible computer readable medium encoded with computer program as recited in claim 17, wherein said information regarding each of said merchants in said list comprises a name and contact information. as recited in claim 17, wherein said information regarding each of said merchants in said list comprises a name and contact information.

21. A tangible computer readable medium encoded with computer program as recited in claim 20 further comprising the programming step of:

storing said information on one of said merchants in said list selected by said user in a directory in said IP phone.

22. A tangible computer readable medium encoded with program as recited in claim 20, wherein said contact information comprises a telephone number, wherein the computer program further comprises the programming steps of:

receiving a selection of said telephone number associated with one of said merchants in said list selected by said user; and initiating a telephone call to said selected merchant via one of a wireless network, a voice network, a public switched telephone network and a data network.

23. A tangible computer readable medium encoded with computer program as recited in claim 17, wherein said merchants in said list of merchants select one of a plurality of advertising services, wherein each of said plurality of advertising services provides a different level of advertising exposure.

24. A tangible computer readable medium encoded with computer program as recited in claim 23, wherein said different level of advertising exposure comprises a different amount of contextual information presented to said user.

* * * * *

UNITED STATES PATENT AND TRADEMARK OFFICE
CERTIFICATE OF CORRECTION

PATENT NO. : 7,525,955 B2
APPLICATION NO. : 11/082361
DATED : April 28, 2009
INVENTOR(S) : Carlos J. Velez-Rivera, Inaki Olivares-Arocho and Jose L. Cruz-Rivera It is certified that error appears in the above-identified patent and that said Letters Patent is hereby corrected as shown below:

In the Claims

*[Claim 9, Column 28, Lines 11-28]*

Claim 9 should be corrected as it was allowed by the patent examiner

A method for performing contextual searches on an Internet Phone (IP) phone comprising the steps of:

receiving a command to perform a contextual search;

receiving search criteria from a user of said IP phone;

submitting said search criteria to a server coupled to said IP phone; and receiving from said server a list of merchants matching said search criteria and information regarding each of said merchants in said list;

*[Language to be added]*

*wherein said user completes a transaction with at least one of said merchants listed without the need to generate a voice call;* wherein said information received by said user comprises a variety of offers, wherein said user selects one of said variety of offers associated with said one of said merchants listed, wherein said selected offer is transmitted to said one of said merchants listed electronically; and wherein said user's contact and payment information is not transmitted to said one of said merchants listed, wherein said user's contact and payment information is available to said one of said merchants listed.

Signed and Sealed this
Twenty-eighth Day of May, 2013

Teresa Stanek Rea
*Acting Director of the United States Patent and Trademark Office*